United States Patent [19]

Kuecker et al.

[11] 4,447,888
[45] May 8, 1984

[54] MIXED PITCH DISPLAY

[75] Inventors: Ward A. Kuecker, Round Rock; Susan D. Stratton; William C. Cason, both of Austin, all of Tex.

[73] Assignee: International Business Machines Corporation, Armonk, N.Y.

[21] Appl. No.: 274,297

[22] Filed: Jun. 16, 1981

[51] Int. Cl.³ .......................... G06F 15/02; G06F 3/14
[52] U.S. Cl. .................................. 364/900; 364/521; 340/720; 340/723; 340/750
[58] Field of Search ... 364/200 MS File, 900 MS File, 364/518, 521, 523; 340/723, 724, 731, 750

[56] References Cited

U.S. PATENT DOCUMENTS

| Re. 30,679 | 7/1981 | Evans et al. | 364/523 |
|---|---|---|---|
| 3,281,822 | 10/1966 | Evans | 340/731 |
| 3,618,032 | 11/1971 | Goldsberry | 364/200 |
| 3,648,271 | 3/1972 | McConnell et al. | 340/731 |
| 3,659,283 | 4/1972 | Ophir | 340/731 |
| 3,668,685 | 6/1972 | Horvath | 340/731 |
| 3,896,428 | 7/1975 | Williams | 340/723 |
| 3,999,168 | 12/1976 | Findley et al. | 178/30 |
| 4,107,665 | 8/1978 | Mayer et al. | 340/731 |
| 4,193,071 | 3/1980 | Hasegawa et al. | 340/723 |
| 4,254,409 | 3/1981 | Busby | 340/731 |
| 4,254,416 | 3/1981 | Lelke | 340/731 |
| 4,283,724 | 8/1981 | Edwards | 340/731 |
| 4,338,673 | 7/1982 | Brown | 364/523 |
| 4,342,096 | 7/1982 | McDevitt | 364/523 |
| 4,357,604 | 11/1982 | Imazeki et al. | 340/731 |
| 4,373,194 | 2/1983 | Demke et al. | 340/731 |

OTHER PUBLICATIONS

'The Raycomp-100-A Video Page Composition Terminal', by Bordosna et al., Electronic Progress, vol. 18, No. 2, pp. 15-22, 1976.
"Varibable-Size Character Generator", IBM Tech. Disc. Bull., vol. 24, No. 4, Sep. 1981, pp. 2210-2211 by R. Moreau.
"Simple Computer and CRT Display", by G. Y. Cho, Control Engineering, Apr. 1964, p. 97.

Primary Examiner—Jerry Smith
Assistant Examiner—William G. Niessen
Attorney, Agent, or Firm—Harold E. Meier

[57] ABSTRACT

Operator keystrokes are processed in a text processor system to put characters and symbols on a fixed pitch display screen without limitation as to other size characters or symbols on the screen. Keystroke data is processed under the control of programs stored in a random access memory. For a mixed pitch display, the random access memory of the system is structured to include a text storage buffer and a display control block both interconnected to an applications program and a display access method program. Data is stored in the text storage buffer in an unformatted configuration in a mixed pitch arrangement and the programs evaluate the data to display characters and symbols with correct character pitch. The programs also draw a scale line on the screen to provide character information to the operator. After running the display access method program in accordance with application program commands, a refresh buffer provides display signals to visually present by means of the display screen characters at an identified position in a mixed pitch format.

18 Claims, 21 Drawing Figures

* "N" = NUMBER OF LINE ON DISPLAY.

* NOTE
—DYFCOFFS ≜ NEW SPATIAL CURSOR POS. TO SEARCH FOR.

MIXED PITCH DISPLAY

TECHNICAL FIELD

This invention relates to character presentation on a display screen in a text processing system, and more particularly to mixed pitch character presentation on a fixed pitch display.

BACKGROUND ART

Office machines for processing text data to produce hard copies utilize display screens for presenting to an operator visual text as it would appear on hard copy. Typically, such machines incorporate a conventional typewriter keyboard with additional control keys for operator interface with the system controls. The operator keystrokes are displayed on a screen quite similar to a home television receiver screen. This screen either displays a full page of text, a partial page, or in some machines only a single line of text. The display not only provides a visual presentation to the operator of the text being prepared but also provides prompting instructions for the operator of how to interface with the machine.

Responding to the keyboard strokes of an operator are system controls including programmed computers which prepare the text display. Most present day text processing systems include electronics hardware programmed to evaluate the operator keystrokes and to control the display. This electronics hardware includes memory for storing character data and instruction data for future use in editing and the preparation of hard copy. Ease of operation of the machine for the operator is in large part determined by the electronics and the associated computers and programs therefor.

One area of importance in determining the acceptability of a text processing system is the ability to display to the operator and prepare hard copy of characters in a mixed pitch format. The pitch of a character is defined as the horizontal space on a line reserved for a character. Heretofore, some office machines have provided variable pitch, that is, each character and symbol has a defined space depending upon the character or symbol. However, most office machines have a fixed pitch with the most common being the 10-pitch and 12-pitch format. A 10-pitch format has ten characters per inch of horizontal line space and a 12-pitch format has twelve characters per inch of line space. Many documents, however, are formatted with a combination of mixed character pitch formats, such as a combination of 10 character pitch and 12 character pitch. The character pitch will usually not change between characters on a line but mixed pitch will appear in lines or paragraphs on a page. For example, a columnar presentation of data may be formatted in 12-pitch while text may be formatted in 10-pitch.

DISCLOSURE OF THE INVENTION

According to the present invention, characters on a display or in hard copy are not restricted to one pitch format, but rather characters on a page may be in a mixed pitch format. Programs within the text processing system will evaluate mixed pitch stored character data and present it in a correct pitch on a fixed pitch display screen and/or on hard copy. A document is formatted using the left margin as a reference to start a character line. The left margin is established with reference to the left paper edge which is shown on a display screen to present to a user a visual appearance of how the hard copy printout will appear.

To improve operator interface between the machine and the display screen, the electronics hardware generates a scale line to provide the operator a visual presentation of the character pitch for an identified line of text. The line of text is identified by a cursor, the position of which is operator controlled through the machine keyboard. Thus, each time the operator moves the cursor to a new text line the scale line is rebuilt to present the character pitch for the cursored line. If the characters on a cursored line are modified in accordance with operator keystrokes, any added characters will be inserted at the identified character pitch. Thus, if an operator is making changes in a line of 10 character pitch, all inserted characters will also be in the 10-pitch format and all deleted characters will be 10-pitch.

In accordance with the present invention, a mixed pitch text presentation is created on a fixed pitch display, such as a screen, by structuring mixed pitch unformatted data in a text storage buffer. Both character data and instructional data is stored in unformatted memory such that there is no direct correlation between the spatial position of a character on the display and a character byte positioned in memory. A processor computes from the unformatted data not only the correct character pitch but the location of the left margin with reference to a page boundary and structures the data for updating a refresh memory. Stored unformatted data is also retrieved from storage for computing a scale line.

In accordance with the present invention, apparatus for displaying characters having different pitch includes a store of a mixed pitch unformatted data stream to be presented on the fixed pitch display. The data stream contains both graphic characters and control instructions including pitch data for each character line. Included within the apparatus is a display access method program for building a scale data stream representing a scale line on the display from the pitch data to provide a presentation of the pitch of characters to a user. This display access method also builds a text data stream representing a character presentation on the display from the graphic character data. Both the scale data stream and the text data stream are input to a refresh buffer for generating outputs to control the display.

The invention relates to both the method and apparatus for providing a fixed pitch display with mixed pitch characters in a text processing system. Apparatus includes hardware for processing keystroke data and stored data in accordance with stored program instructions.

BRIEF DESCRIPTION OF THE DRAWINGS

A more complete understanding of the invention and its advantages will be apparent from the specification and claims and from the accompanying drawings illustrative of the invention.

Referring to the drawings:

FIG. 3 is a detail of the formatting of the storage for the system of FIG. 1 as structured for mixed pitch display with a scale line on a fixed pitch display;

DETAILED DESCRIPTION

Figure 1:
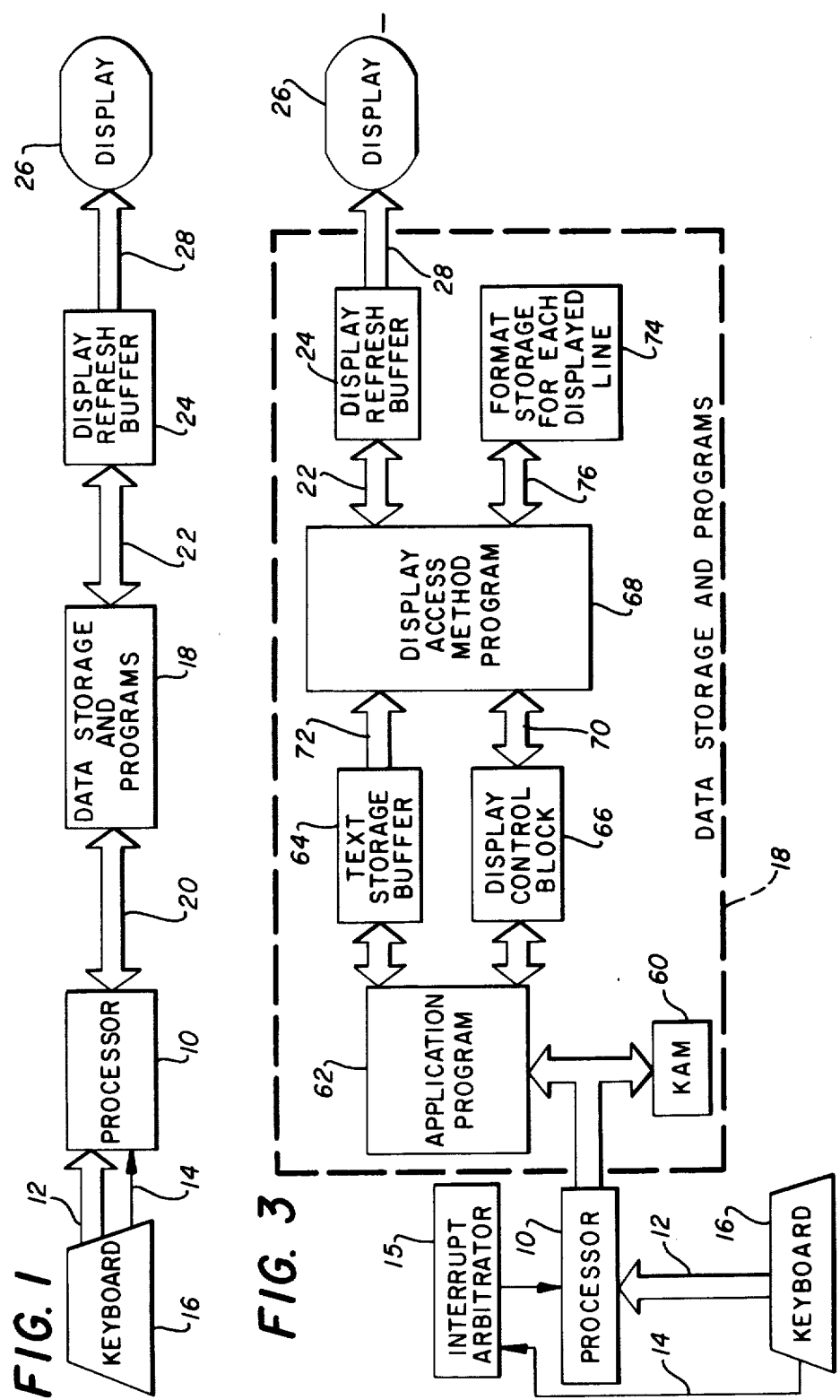
FIG. 1 is a basic block diagram of a text processing system including a keyboard, processor, memory storage and a display screen for visual presentation to an operator of text and operating instructions.

Referring to FIG. 1, a text processing system is shown including a processor 10, interconnected by means of a data bus 12 and control lines 14 to a keyboard 16. Included on the keyboard are conventional alpha-numeric characters found on the standard typewriter keyboard. In addition the keyboard includes symbol keys, such as backspace, carrier return and tab settings along with function keys used to instruct the system to perform certain operations, to control the way a display is created, or to provide information about stored textual data. In addition, the keyboard includes code keys that are used in conjunction with another key to input special instructions to the processor 10.

Keystroke data transferred to the processor 10 over the data bus 12 in the form of 7-bit bytes is processed by instructions stored in a random access memory 18 by means of an interconnecting data bus 20. The random access memory 18 stores the keystroke data bytes in addition to instructions for operation of the processor 10.

Also connected to the random access memory 18 by means of a data bus 22 is a display refresh buffer 24 that receives display data for formatting a visual presentation on a display screen 26. Control signals for operation of the display screen 26 are provided along a data bus 28.

Typically, the display screen 26 is a cathode ray tube, and in a preferred embodiment of the present invention, was formatted into four virtual images, the major one of which displayed twenty lines of text information. The total line capacity of the display was twenty-five lines with the first two lines reserved as a virtual display for document formatting information including character pitch identification and the bottom two lines of the display reserved for virtual images as a prompt line and a message line to give an operator instructions on the control of the text processing system of FIG. 1. It should be understood, however, that the mixed pitch display will function on any size screen.

Figure 2:
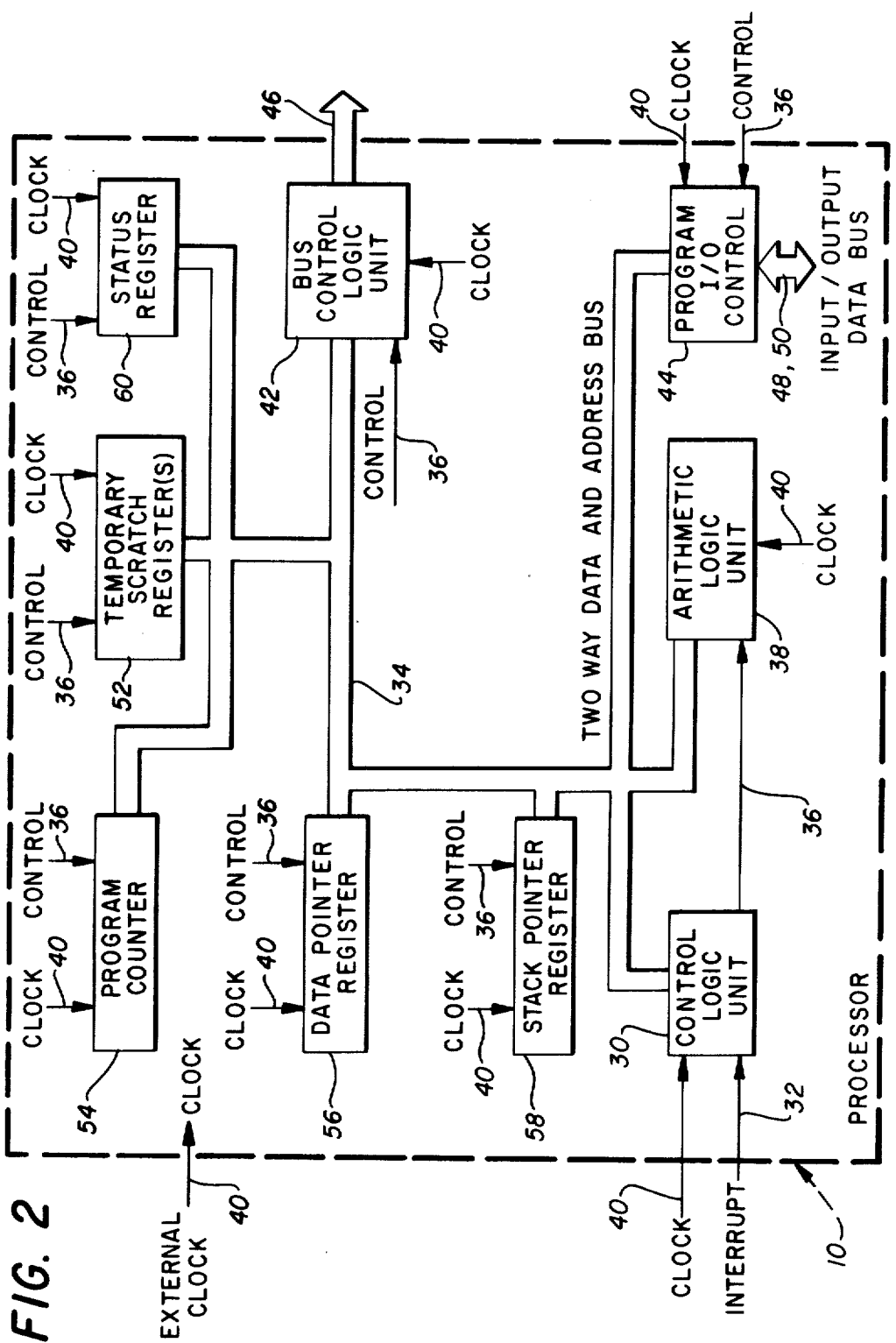
FIG. 2 is a block diagram showing logic hardware detail of the processor of FIG. 1 with interconnecting control and data bus paths.

Referring to FIG. 2, the processor 10 is further detailed to show typical logic hardware elements as found in such processors. The processor may be a commercially available unit, such as from Intel Corporation and identified by the Number 8086. Typically the processor includes a control logic unit 30 which responds to interrupts on a device bus 32 from the keyboard 16. The control logic unit 30 is also connected to the data and address bus 34 interconnected to various other logic units of the processor 10.

In response to a fetch instruction from the random access memory, the control logic unit 30 generates control signals to other logic elements of the processor. These control signals are interconnected to the various elements by means of a control line 36 which is illustrated directly connected to an arithmetic logic unit 38 and identified as a "control" line 36 to other elements of the processor. Synchronous operation of the control unit 30 with other logic elements of the processor 10 is achieved by means of clock pulses input to the processor from an external clock source. This instruction bus is also shown interconnected to other logic elements of the processor detailed on FIG. 2.

Data and instructions to be processed in the processor 10 are input through a bus control logic unit 42. Data to be processed may also come from program input/output control logic 44. The bus control logic 42 interconnects storage elements of the random access memory 18 and receives instructions for processing data received from the input/output control 44 or received from the random access memory. Thus, the input/output control 44 receives data from the keyboard 16 or the random access memory 18 while the bus control logic 42 receives instructions and/or data from the same memory. Note that different storage sections of the random access memory are identifiable for instruction storage and data storage.

Device control information from the processor 10 is output through the program input/output controller 44 over a data bus (12, 20). Input data on the data bus (12, 20) from the keyboard 16 is processed internally through the processor by instructions on the bus 34 to a status register 60. The arithmetic logic unit 38 in reponse to a control signal on line 36 and in accordance with instructions received on the memory bus 46 performs arithmatic computations which may be stored in temporary scratch registers 52. Various other transfers of data between the arithmatic logic unit 38 and other logic elements of the processor are of course possible. Such additional transfers may be to the status register 60, a data point register 56 or a stack pointer register 58. Also in the data stream for these various logic elements by means of the bus 34 is a program counter 54.

A particular operating sequence for the processor 10 is determined by instructions and data on the memory bus 46 and input data on the bi-directional bus (12, 20). As an example, in response to received instructions, the processor transfers data stored in the scratch registers 52 to one of the registers 56, 58 or 60. Such operations of processors as detailed in FIG. 2 are considered to be well known and understood by one of ordinary skill in the data processing field. A detailed description of each operation of the processor of FIG. 2 for the described invention would be counterproductive to an understanding of the invention as claimed.

Referring to FIG. 3, there is shown one operational format of the random access memory 18 that includes storage locations defining the display refresh buffer 24. In FIG. 3 the keyboard 16 is shown with the data bus 12 connected directly to the processor 10 while the control bus 14 is connected through an interrupt arbitrator 15 to the processor. The interrupt arbitrator 15 is logic hardware that receives all system interrupts and processes them on a priority basis to the control logic unit 30 of the processor 10. For purposes of describing the present invention directed to mixed pitch presentation of characters on the fixed pitch display screen 26, only the keystroke interrupt will be considered.

As formatted, the random access memory 18 includes a keystroke access method 60 made up from defined storage locations. It should be understood that each of the identifiable areas of storage in the random access memory 18 comprise storage locations addressable by conventional techniques. Thus, the keystroke access method 60 receives keystroke data bytes over the data bus 20 which is also connected to an application program memory 62. Stored in the application program memory 62 are application programs consisting of instructions and data bytes transferred between the application program memory 62 and a text storage buffer 64 or a display control block memory 66. As the name implies, the text storage buffer (TSB) 64 contains a data stream of mixed pitch unformatted text. Each byte in this data stream is either a graphic item (that is, letters, numbers, etc.) of single byte length, a single byte control instruction (that is, a line end, tab stop, carriage return, etc.) or a multi-byte control code. A multi-byte control code is a string of data "N" bytes long that contains information on how to format the data stream in the text storage buffer. Typical of multi-byte control codes are "left" and "right" margin settings, tab stops, character pitch, etc. Thus, the text storage buffer 64 is that area of the random access memory 18 that contains the data stream, part or all of which is to be formatted as a mixed pitch presentation on the fixed pitch display screen 26.

That area of the memory 18 identified as the display control block (DCB) 66 receives data and instructions from the applications program memory area 62 to generate formatting instructions to a display access method (DAM) program 68. These formatting instructions are passed between the display control block (DCB) and the DAM program 68 by means of an instruction bus 70. The display control block 66 is a storage area that is used by the applications program of the memory area 62 to pass parameters and commands to the DAM program 68. The display control block 66 is also used by the DAM program 68 to pass parameters back to the applications program memory area 62 when the DAM program returns to the user. Most of the parameters in the display control block 66 are utilized by the DAM program 68 as inputs on the next call command that is not a build command.

Also received by the display access method program 68 are graphic bytes and control bytes from the text storage buffer 64 on a data bus 72.

In response to instructions from the display control block 66, the display access method program 68 formats the data from the text storage buffer 64 for inputting to the display refresh buffer 24 over the data bus 22. Also required for formatting of a display by the DAM program 68 is display information stored in a format storage area 74 which data is transferred between the DAM program 68 and the storage 74 by means of a data bus 76.

By operation of the random access memory 18 in conjunction with the processor 10, in the manner to be described with reference to FIGS. 4–17, a presentation of text is made on the display screen 26 that includes an indication of a mixture of character pitch as defined by operator keystrokes via the scale line changing as the cursor crosses pitch boundaries.

Typically, the random access memory 18 contains instructions and data stored therein at various address locations. Instructions are loaded into the random access memory 18 for formatting the address locations to perform the function identified to the system. Alternatively, the random access memory may be replaced entirely by a combination of hard wired logic which would also replace the processor 10 such that "instructions" and the processor are not utilized. The flow diagrams described hereinafter will enable any person having skill in the art of logic design to specify hardware logic in accordance with the concepts of the claimed invention. These flow diagrams will also enable anyone having skill in the art of computer programming to program a general purpose digital computer to perform the functions described, that is, the presentation of mixed pitch of characters on the fixed pitch display of a text processing system.

Prior to continuing with the description of the figures describing mixed pitch display on a fixed pitch screen, certain terms need to be defined to assist in an understanding of the invention.

DEFINITIONS

1. TEXT STORAGE BUFFER (TSB) is the area 64 in the random access memory 18 that contains the data stream, all or part of which is to be formatted on the display screen 26.
2. CONTEXTUAL CURSOR ADDRESS (CCA) is the address in the data stream that the operator perceives as an edit point, this address can be any place within the defined boundaries of the text storage buffer.
3. CURSOR LINE ADDRESS (CLA) is the text line starting address on which is found the contextual cursor address.

4. WINDOW TOP ADDRESS (WTA) is the text line start address which is the first line of text on the display screen 26.
5. LEFT PAPER EDGE (LPE) is the left edge of a paper upon which the text in the text storage buffer will be printed.
6. TEXT LEFT MARGIN (TLM) is the number of white character spaces from the left paper edge to the first position for graphic display on a line of displayed text. The TLM value is expressed as 1/1440 inch and indicates the amount of "white space" from the LPE to the first printed character for an identified text line.
7. SCREEN WIDTH (SW) is the number of character boxes (spaces) on a horizontal line of the display screen 26. This is also identified on occasion as display size (DS).
8. TEXT TUBE LEFT (TTL) is the number of character spaces from the left paper edge to the first character position at the left edge of a line of text on the display screen 26.
9. SPATIAL CURSOR (SC) is the (X) and (Y) position on the display screen 26 of the contextual cursor address as perceived by the operator where Y is the number of lines down from the top of the display and X is the number of character boxes from the left edge of the display area.
10. DELTA X ($\Delta$X) is the left or right spatial difference from the present X position to a new spatial position the operator identifies by keystroke entry.
11. DELTA Y ($\Delta$Y) is the up or down spatial difference from the present Y position to a new spatial position identified by the operator for a keystroke entry.
12. ESCAPEMENT CHARACTER COUNT (ECC) also DISPLAYABLE CHARACTER COUNT (DCC) is the number of displayable character positions from the left paper edge through the contextual cursor address for the line on which the cursor appears.
13. LINE END COUNT (LEC) is the number of line ends processed from some starting address to a stopping point.
14. CHARACTER PITCH is the value expressed as 1/1440 inch and indicates the amount of horizontal space each character is allotted on a text line.

As a further explanation prior to proceeding with description of FIGS. 4–17, it should be pointed out that the display screen 26 does not necessarily include all the text data in the text storage buffer 64. Only a limited number of text lines will be displayed whereas the total number of text lines may often exceed this number.

Figure 4:
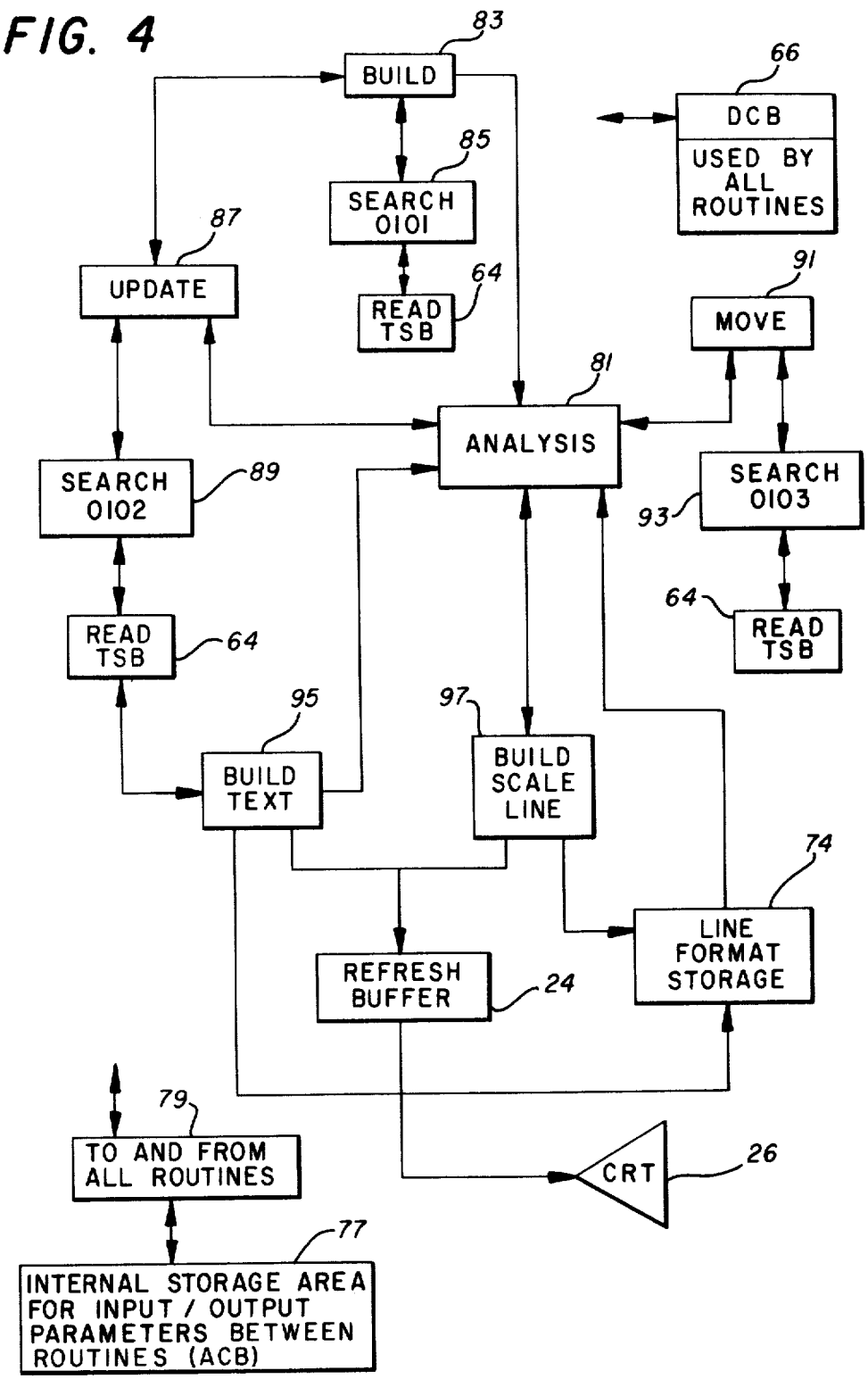
FIG. 4 illustrates a functional structuring of a display access method program for building a new mixed pitch display image, updating the characters or moving the cursor of an identified pitch by means of changing data in a refresh buffer.

Referring to FIG. 4, there is shown a block diagram of the various parts and subroutines of the DAM program 68 for presenting a mixed pitch display of text on the fixed pitch display screen 26 by means of the display refresh buffer 24. Various subroutines of the DAM program 68 communicate with the text storage buffer 64 as illustrated in the drawings.

As previously explained, the display control block 66 is a storage area in memory that is used to pass parameters and commands to the analysis portion of the DAM program 68. It is also utilized by the DAM program 68 to pass parameters back to the application program 62 when the DAM program 68 returns to the user. Another storage area servicing all subroutines of DAM program 68 is an analysis control block (ACB) 77 interconnected to and from all the routines by means of the block 79. The ACB storage area 77 is an internal storage in the memory that is used by the DAM program 68 to pass parameters between the various subroutines as illustrated in FIG. 4.

Central to the DAM program 68 is an analysis sequence of instructions which is the main body of instructions for the DAM program. The analysis sequence determines what instruction is to be carried out and in what sequence. Included within the analysis block 81 are instructions for setting up the analysis control block storage area 77.

For every obsolescence of the data on the display screen 26 the DAM program 68 runs a build subroutine 83 to find the format of a cursored line and the first text line on the screen 26. During the running of the build subroutine 83 a search 0101 subroutine 85 is called which is one of several such search subroutines and will be detailed later in the description. To run the 0101 search subroutine requires the retrieval of data from the TSB 64.

Another often called subroutine from the analysis section 81 is an UPDATE subroutine 87 which sets formatting data of a cursored line when the contextual cursor address is known. To run the update subroutine 87 requires the calling of a 0102 search subroutine 89 having a data link with the TSB 64. The third major subroutine of the DAM program 68 is the MOVE subroutine 91 which is run to determine formatting data of a cursored line when the contextual cursor address is not known and only the $\Delta$X and $\Delta$Y values are available from a previous location. To run the move subroutine 91 requires the calling of a 0103 search subroutine 93 that is in data communication with the TSB 64. Each of the search subroutines 0101, 0102, and 0103 search the TSB 64 for required parameters to run the respective subroutine.

Following the calling of the BUILD subroutine 83, the UPDATE subroutine 87 or the MOVE subroutine 91, the DAM program 68 runs a BUILD-TEXT subroutine 95 to format data in the TSB 64 and generate outputs to the refresh buffer 24 for presenting a text image on the display screen 26. Also required for mixed pitch text display on the screen 26 is the running of a "BUILD SCALE LINE" subroutine 97 from the analysis section 81. Running of the BUILD SCALE LINE subroutine 97 generates outputs to the refresh buffer 24 for presenting on the display screen 26 a line of data indicating to a user the pitch of a cursored line along with the character position of the cursor on an identified line of text.

Also forming a part of the DAM program 68 is a line format storage 74 receiving format data from the build text and BUILD SCALE LINE subroutine 97. The line format storage 74 is accessed to provide data to the analysis section 81. Format data stored in the line format storage 74 includes the left margin of a cursored line, the pitch of characters on the line, and the starting address of the line in the TSB 64. The scale indicates a character position from the left paper edge for the contextual cursor address.

Figure 5:
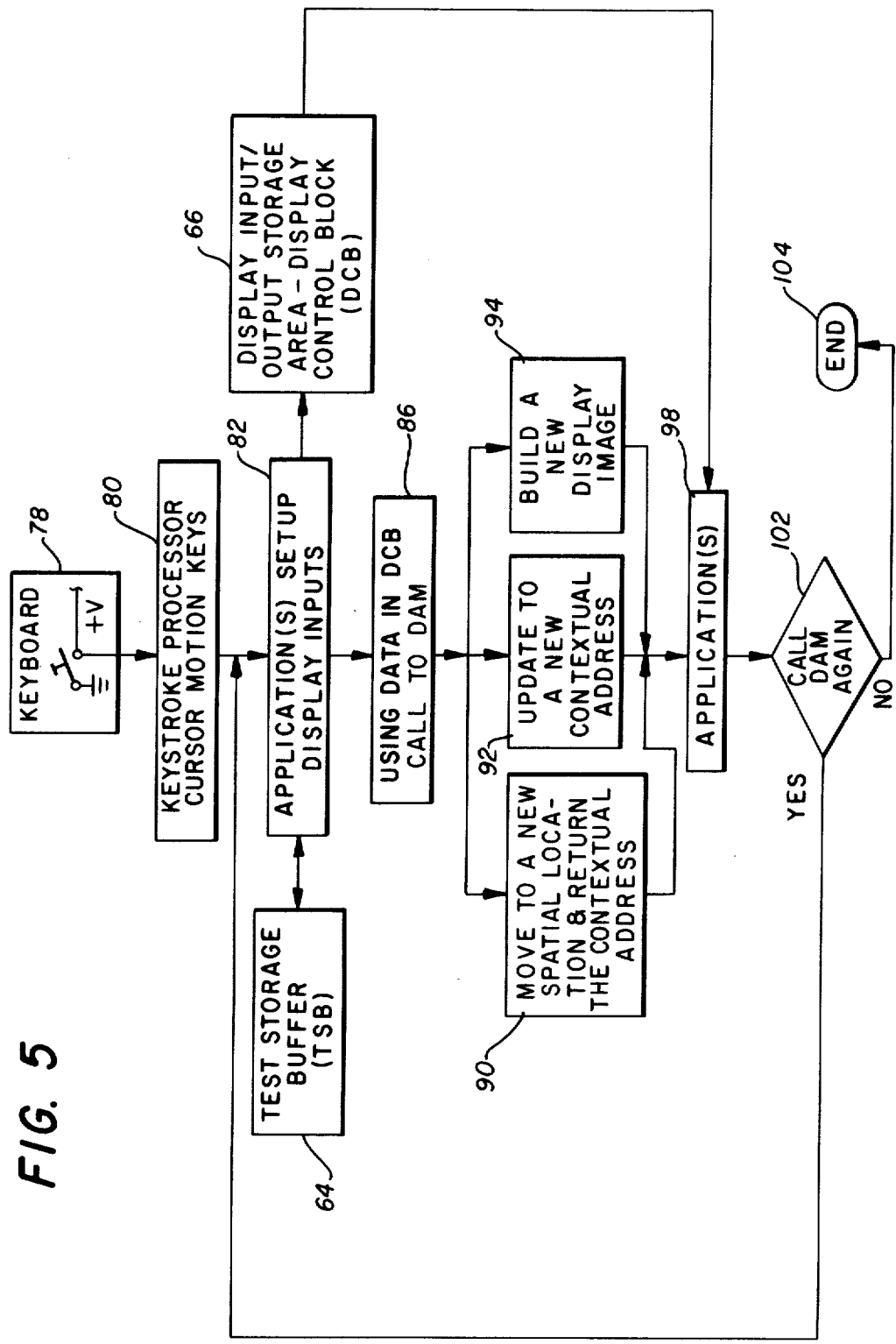
FIG. 5 illustrates operation of the processor of FIG. 1 with instructions from storage and data in the display control block to build or update text or move the cursor on a fixed display.

Referring to FIG. 5, there is shown a flow chart of the operation of the DAM program 68 for displaying text on the display screen 26. An operator inputs a keystroke data at 78. The keystroke is processed in the processor 10 at sequence 80 and input into the keystroke access memory 60. An application set-up is selected at 82 which for purposes of the description of the present invention will be defined as a text application. The various application programs are called by a command from the applications program 62 in response to an interrupt. Other application programs for display include a "menu" application, multiple virtual image displays, and a diagnosis application. The text application is selected from the application program 62 that calls the DAM program 68. The DAM program 68 retrieves instructions from the display control block 66 and for a text display looks to the text storage buffer at sequence 82 to provide graphic and controlled data bytes.

After retrieving data from the text storage buffer 64, the display access method program 68 receives data from the display control block 66 and calls one of several subroutines by a call from the process 86. One of the subroutines to be called is subroutine 90 that is identified as a "MOVE" and during the running of this subroutine the display access method program 68 moves the cursor to a new location. This subroutine is called to resolve a contextual pointer position and receives a spatial location as an input and outputs the corresponding contextual location. Still another possible subroutine called by the DAM program 68 at control block 86 is identified as an "UPDATE" subroutine 92. This subroutine provides instructions for operation of the display access method program 68 to update the textual display starting with the line on which the cursor presently appears on the display screen 26. During this subroutine the display access method program 68 reformats the identified line and performs horizontal or vertical segmentation as required.

The primary subroutine that is called by the control block at 86 is used not only for display formatting but for other applications of the text processing system and is identified as a "BUILD" subroutine 94. The BUILD subroutine provides data and instructions to format the display using the mixed pitch unformatted data from the text storage buffer 64. This subroutine is run to return the display screen 26 to a prior state, for example, following the return from a menu display; initially format text, for example, entry by an operator to revise text on a page; or to format text which has been changed, for example, following a "boundary" key. Primarily the BUILD subroutine is run when the text from the text storage buffer 64 has changed such that the prior image is obsolete.

Following the return of any of the subroutines 90, 92, or 94 to the routine of FIG. 5 an application check is made on the output data in the display control block, as represented by the block 98, to again run the DAM program 68. The program call may be for one of the discussed subroutines for mixed pitch text display or another operation of the text processing system. A test is made at 102 to determine if the DAM program is to be called again by the application set-up 82, or if the program is to step to an end at 104.

Figure 6:
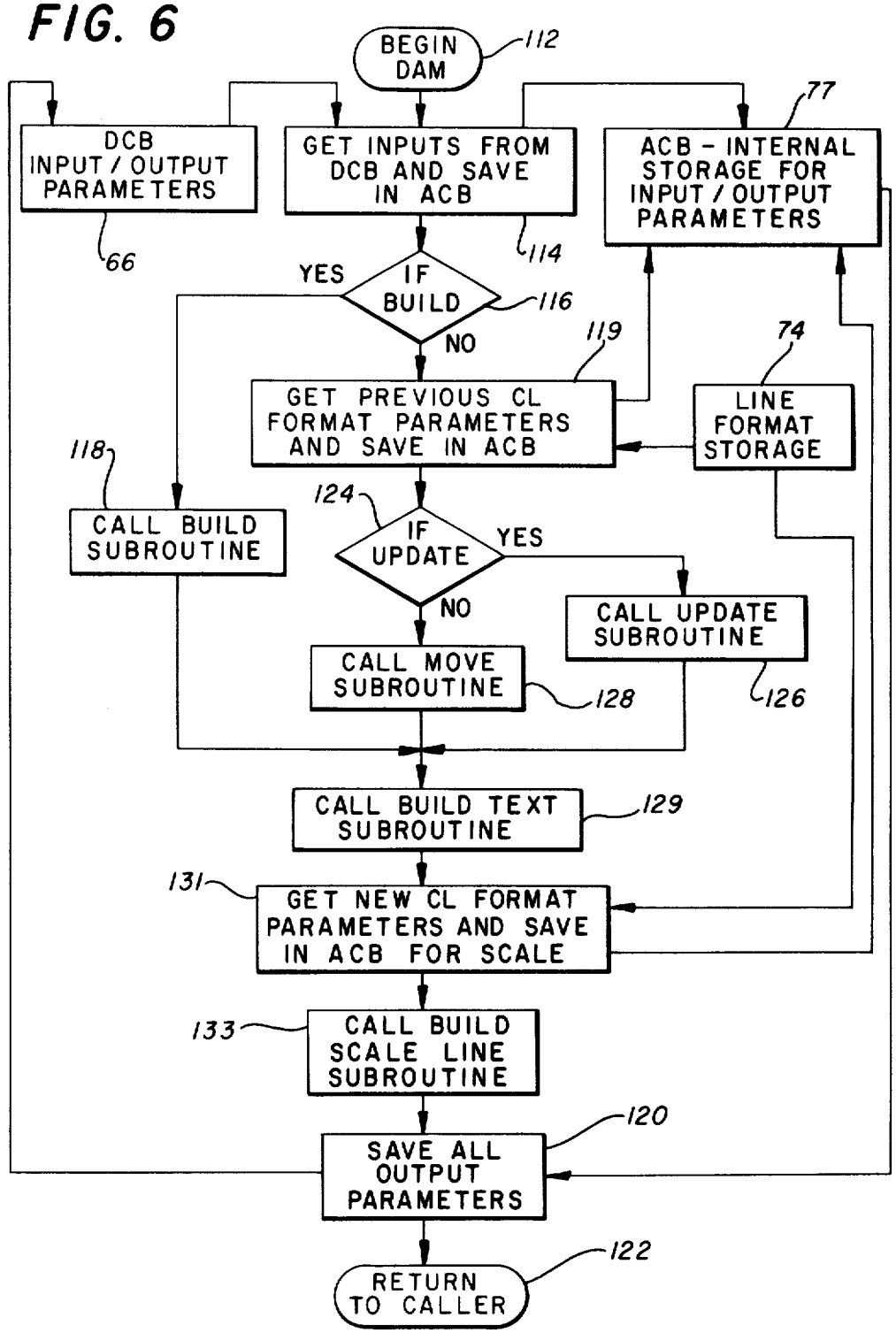
FIG. 6 illustrates an operation of the display access method program for selecting one of several subroutines called for displaying mixed pitch text on a fixed pitch screen where the text includes both characters and instructional information screen formatting.

Referring to FIG. 6, when an applications interrupt occurs as the result of a keystroke the DAM program 68 is called and runs the illustrated routine which is called at 112 from the control block 86. Initially input parameters are obtained at 114 from the display input/output storage area of the display control block 66 and saved in the ACB storage area 77. A test 116 is then made to determine if the build flag has been set. When the control block 86 calls the "BUILD" display subroutine then it is called at sequence 118. Upon completion of the BUILD subroutine at sequence 118 the DAM program 68 calls the "BUILD TEXT" subroutine at sequence 129.

If the BUILD subroutine is not identified as being called at test 116, then previous parameters for the present cursored line are obtained at block 119 and saved in the ACB storage area 77. A test 124 is then made to determine if the control block 86 is calling for a display update which calls the UPDATE subroutine at sequence 126. Upon completion of the UPDATE subroutine, the DAM program 68 calls the "BUILD TEXT" subroutine at sequence 129.

If the UPDATE subroutine is not called at sequence 124, then the routine of FIG. 6 calls the MOVE subroutine at sequence 128 and upon completion of this subroutine the "BUILD TEXT" subroutine is called at sequence 129.

As described, upon completion of the BUILD subroutine 118, the UPDATE subroutine 126, or the MOVE subroutine 128, the DAM program 68 calls the BUILD-TEXT subroutine 129. Following completion of the BUILD-TEXT subroutine 129 the DAM program 68 advances to sequence 131 to obtain new cursored line format parameters from the line format storage 74 and saves these parameters in the ACB storage 77. Parameters in the ACB storage 77 are called during the running of the BUILD SCALE LINE subroutine. The BUILD SCALE LINE subroutine 133 is called after fetching the format parameters from the line format storage 74. Upon completion of the BUILD SCALE LINE subroutine 133 all output parameters are saved at sequence 120 in the DCB 66. The DAM program 68 returns operation of the memory 18 to the applications program 62, which is the caller, at return 122.

Figure 7A:
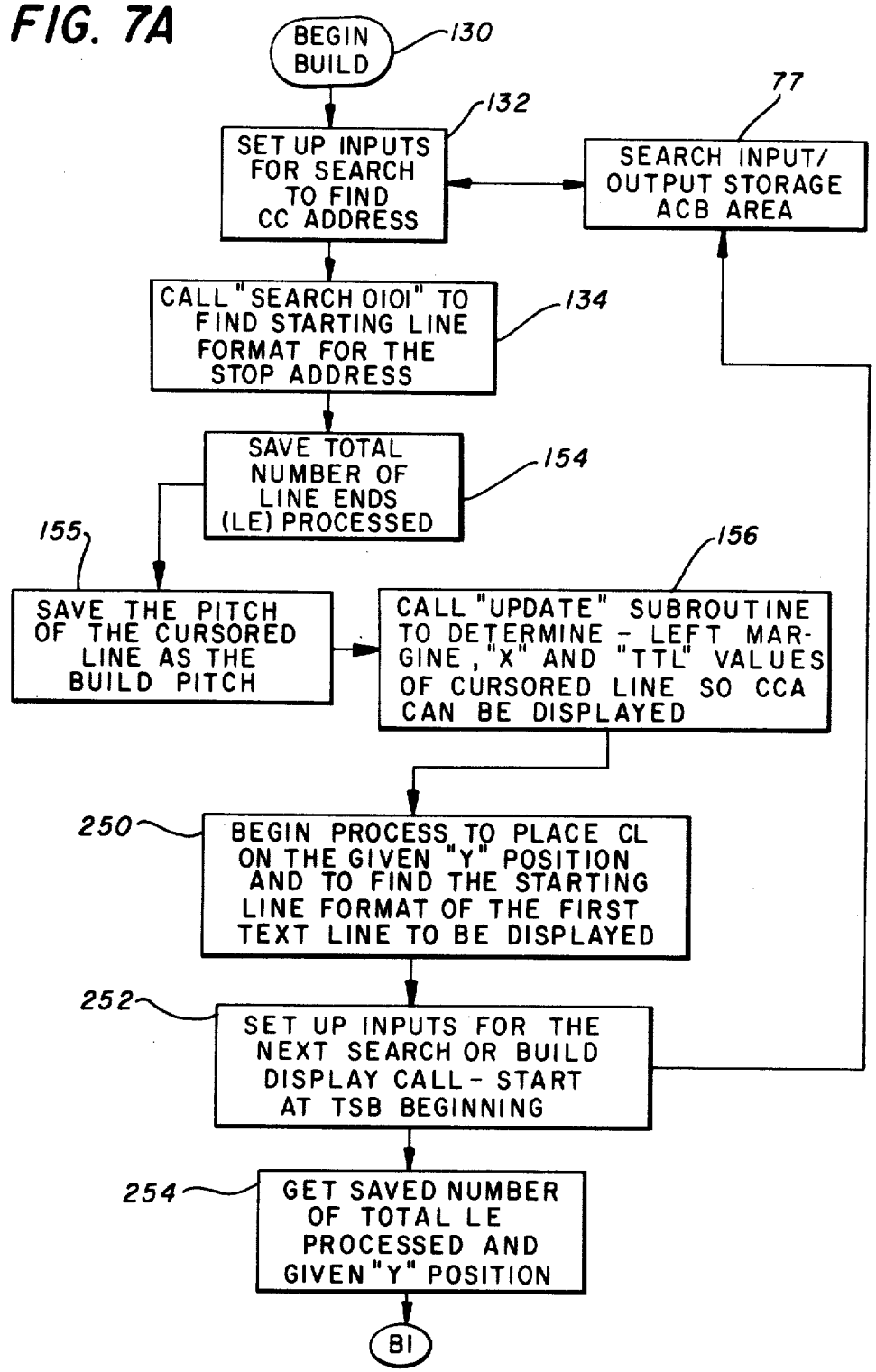
FIGS. 7A and 7B show the operation of the BUILD subroutine called during the sequence of FIG. 6 for building a display.
Figure 7B:
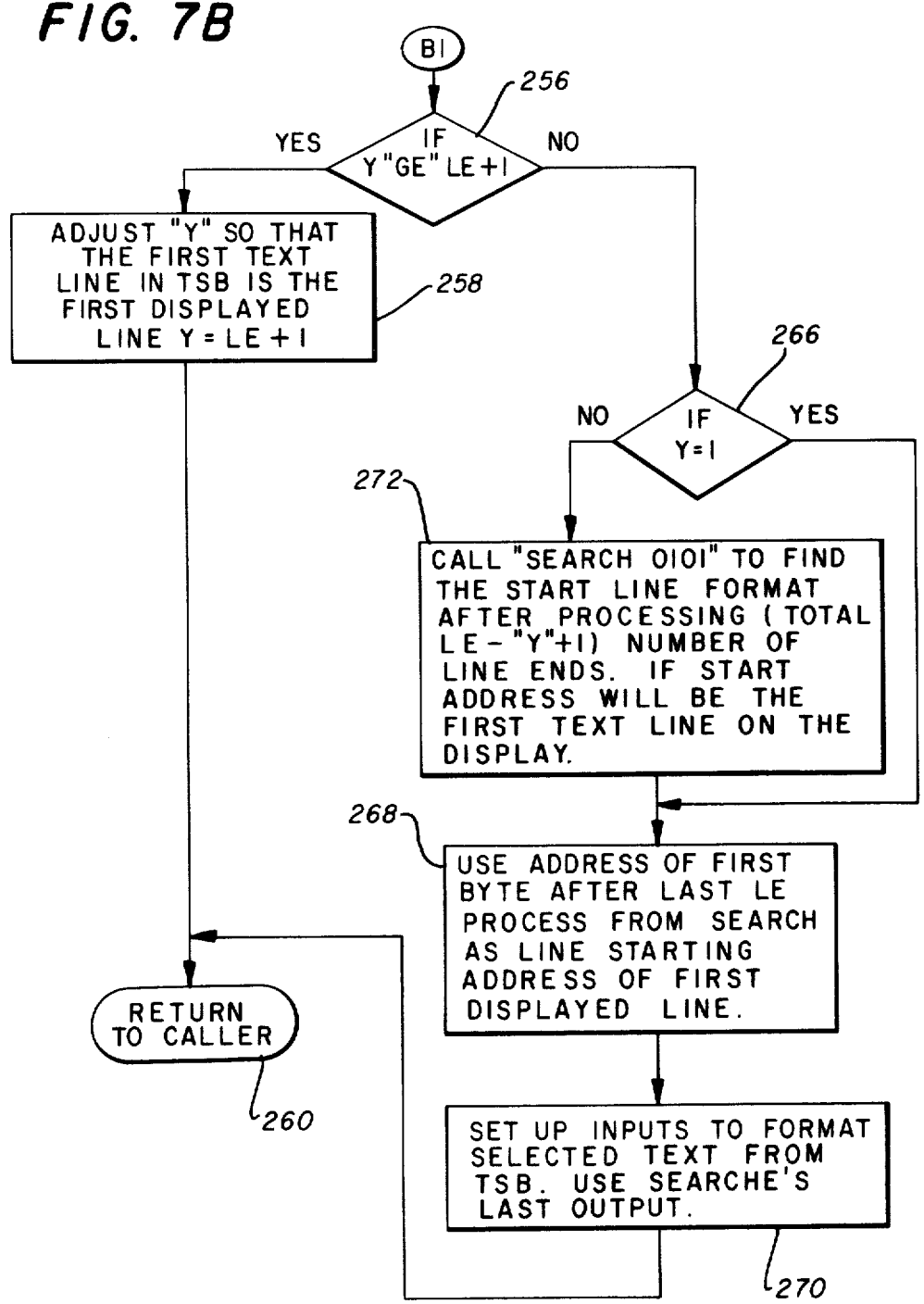

Considering next each of the subroutines to be called by the running of the routine of FIG. 6, FIGS. 7A and 7B illustrate the operation of the DAM program 68 when a build of the display is required. The BUILD subroutine is called by a command 130. Upon entering the BUILD subroutine, first inputs are set up at sequence 132 for a search to find the contextual cursor address, which is in the text storage buffer 64, and saved parameters are returned from the ACB storage area 77. After setting up the inputs for the search the BUILD subroutine calls a "0101" search subroutine 134 to find the starting line format for the stop address.

Figure 8:
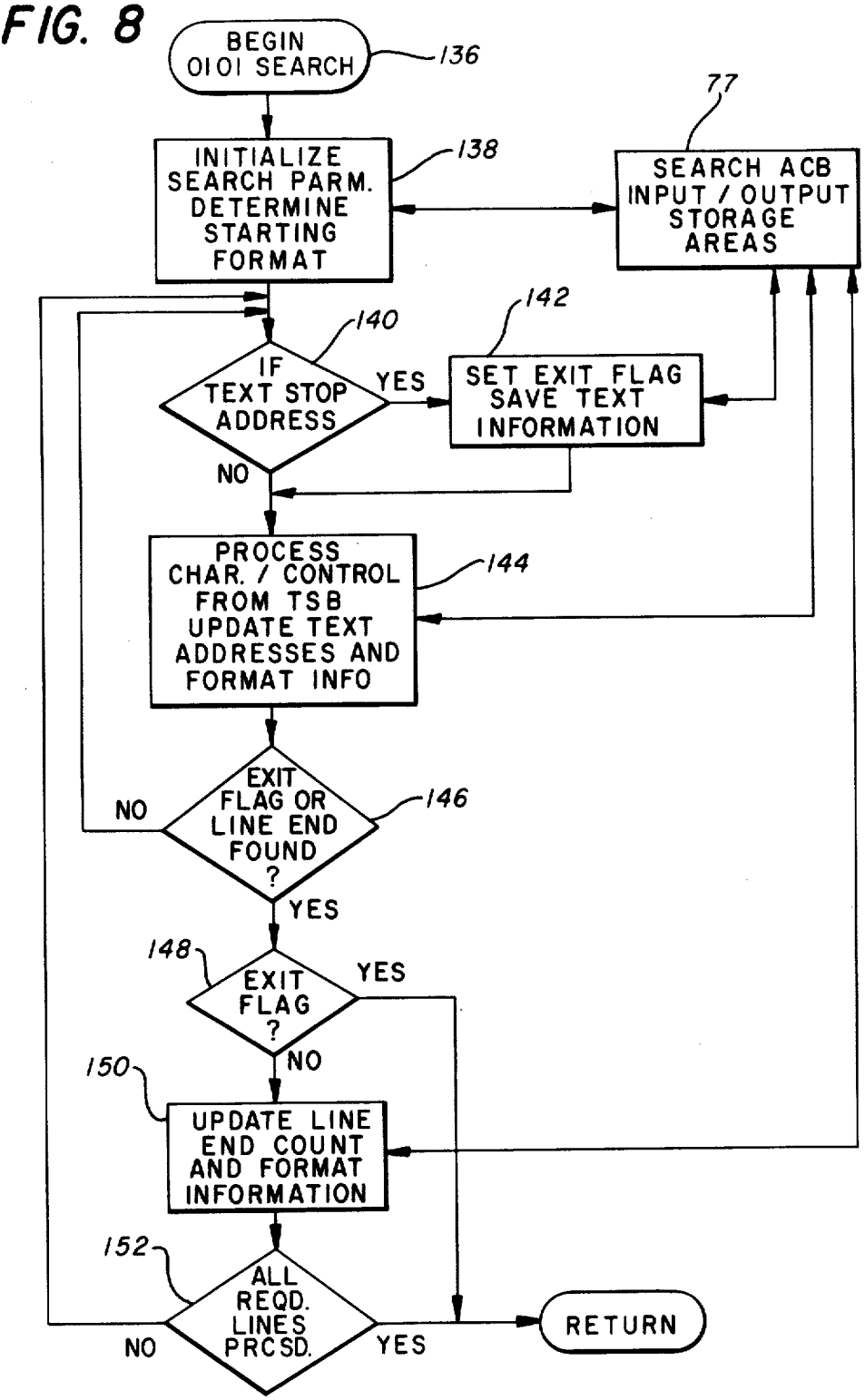
FIG. 8 illustrates an operation of a search subroutine called during the servicing of the subroutine of FIGS. 7A and 7B for building a display image.

Referring to FIG. 8, there is shown a flow chart of the 0101 search subroutine which is called by a command 136. First search parameters are initialized at sequence 138 to determine the starting format from data in the ACB storage area 77. Data retrieved from the ACB storage area 77 for initializing search parameters at sequence 138 include the text starting address, a search stop address, the start address of data in the text storage buffer 64 along with the length of data in the text storage buffer. In addition, the number of line ends to be processed is a parameter retrieved from the ACB storage area 77. These various inputs are retrieved from the ACB storage area 77 during the running of the 0101 search subroutine.

After initializing the search parameters at sequence 138 a test 140 is made comparing the current text address with the text stop address and if a comparison is found sets the exit flag and saves the text information at sequence 142. If the test 140 does not find a text stop address or when the exit flag is set at sequence 142, the subroutine of FIG. 8 processes character and control data from the text storage buffer 64 to update text addresses and format information during the sequence 144. A test 146 is made to determine if the exit flag has been set or if a line end has been found. If neither of these events has occurred, the loop will return the subroutine to the test 140. When either of these events has occurred, then a test 148 is made to determine if the exit flag has been set. If set, the subroutine steps to return to the subroutine of FIGS. 7A and 7B at sequence 134.

When the exit flag has not been set the 0101 search subroutine updates the line end count and format information at sequence 150 in the ACB search area 77. Upon completion of this updating and formatting a test 152 is made to determine if all the required lines have been processed. If not, then the loop recycles to test 140 and continues until all required lines have been processed at which time the subroutine is completed and returns to the sequence 134 of FIGS. 7A and 7B.

Upon completion of the subroutine of FIG. 8 data available for further processing and stored in the ACB storage area 77 is the cursored line start address, a left margin identification, and pitch information for the cursored line. In addition, the number of line ends processed is also stored in the ACB storage area 77 for further processing. With reference to the left margin and pitch data, these are used as starting values for input and output searching, a build value, and as a cursored line value. With reference to the cursored line start address data, this is also used as the start address of a line after the last line end processed.

Returning to the BUILD subroutine of FIGS. 7A and 7B, upon completion of the 0101 search subroutine the total number of line ends processed is saved at sequence 154 and the pitch of the cursored line is saved at 155 to be subsequently used as pitch data in the BUILD TEXT subroutine 95. Next, the UPDATE subroutine 87 is called at sequence 156 to determine left margin values, along with the "X" and "TTL" values of the cursored line so that the contextual cursored address can be displayed.

Figure 9:
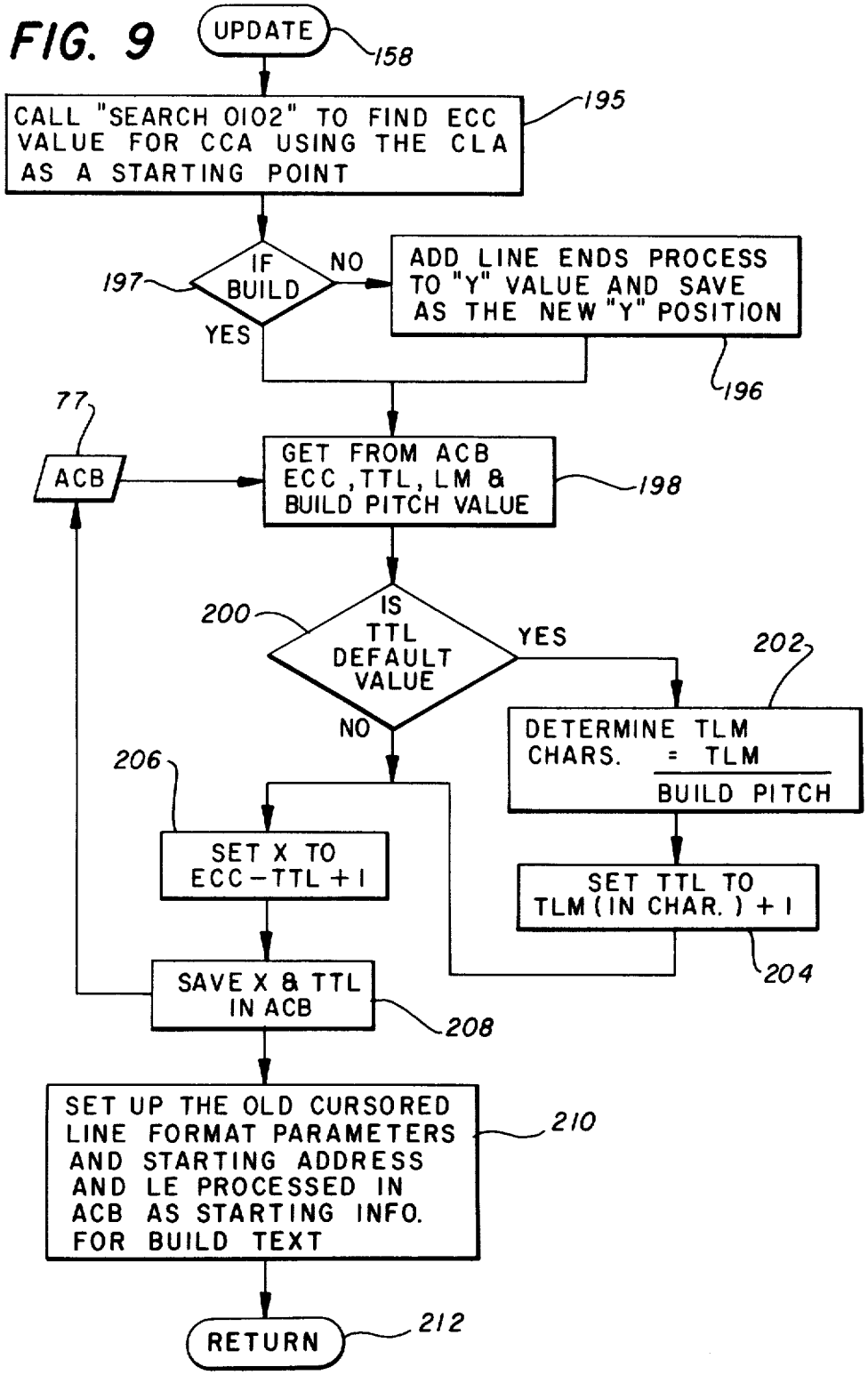
FIG. 9 illustrates the operation of the UPDATE subroutine called during the servicing of the sequence of FIG. 6 to update display information in a refresh buffer.

Referring to FIG. 9, there is shown a flow chart for the UPDATE subroutine 87 when called at the sequence 156. The subroutine 87 is entered at command 158. Upon entering the subroutine 87 a 0102 search subroutine 89 is called to find the escapement character count (ECC) value for the contextual cursor address using the cursored line address as a starting point.

Figure 10:
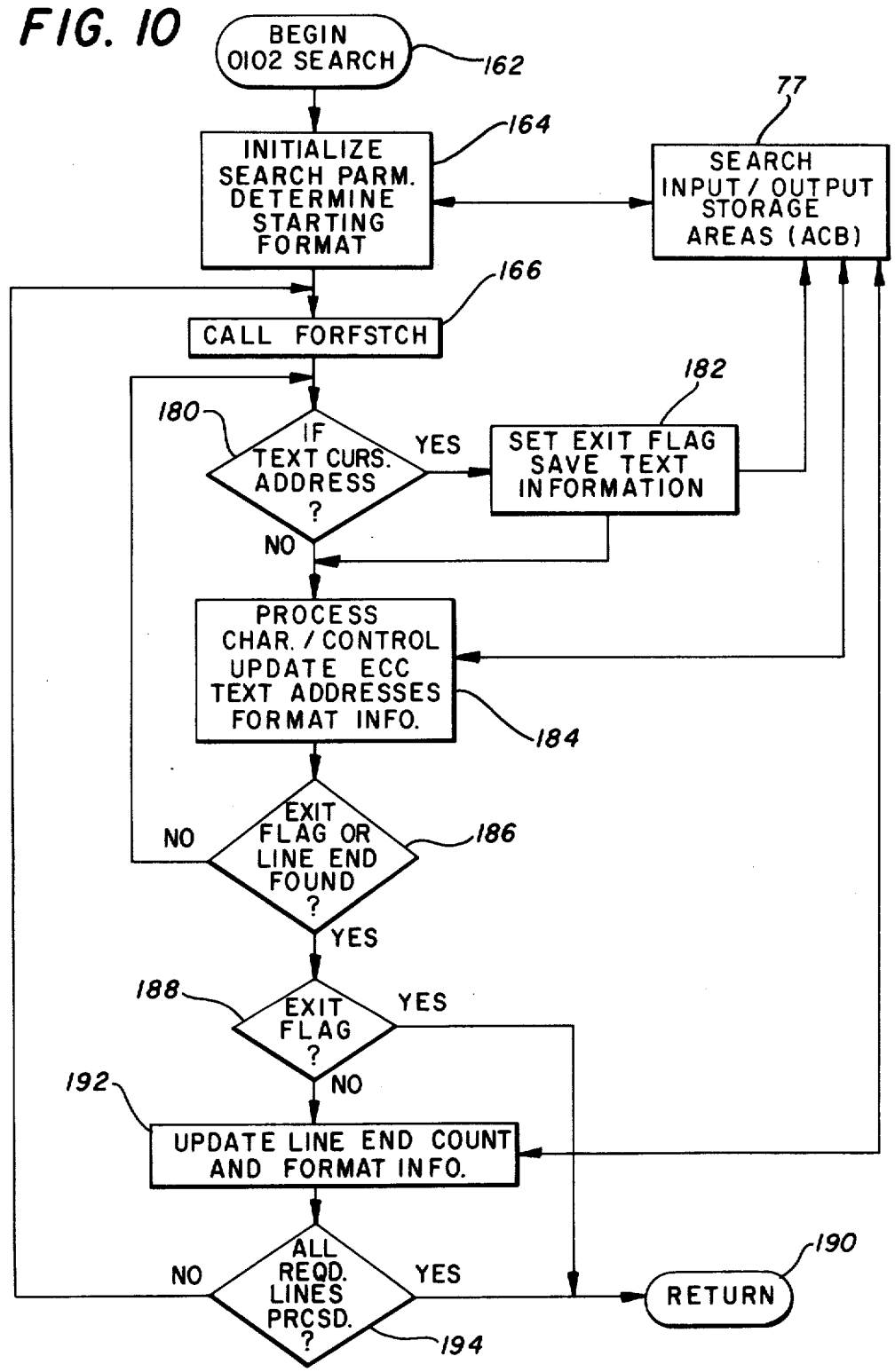
FIG. 10 illustrates the operation of a search subroutine called during the servicing of the subroutine of FIG. 9 to update line end count and format information.

Referring to FIG. 10, there is shown a flow chart for the 0102 search subroutine 89 which is entered at command 162 to find the escapement character count (ECC) given a contextual cursor address (CCA). The 0102 search subroutine is a search of the cursored character line and the beginning format information of this line has been previously provided by the 0101 search subroutine of FIG. 8. Upon entering the 0102 search subroutine, search parameters are first initialized at sequence 164 which parameters are retrieved from the ACB storage area 77. These parameters are the text starting address in the TSB 64, the contextual cursor address (which is the search stop address), the search stop address, the start address of the text storage buffer 64 along with the length thereof. Additional parameters retrieved from the ACB storage area 77 include the cursored line start address along with the left margin of the cursored line, the pitch of characters on this line, and number of line ends to be processed. Upon completion of the initialization at sequence 164 a subroutine for initializing line start parameters is called at sequence 166. This subroutine is illustrated by the flow chart of FIG. 11.

Figure 11:
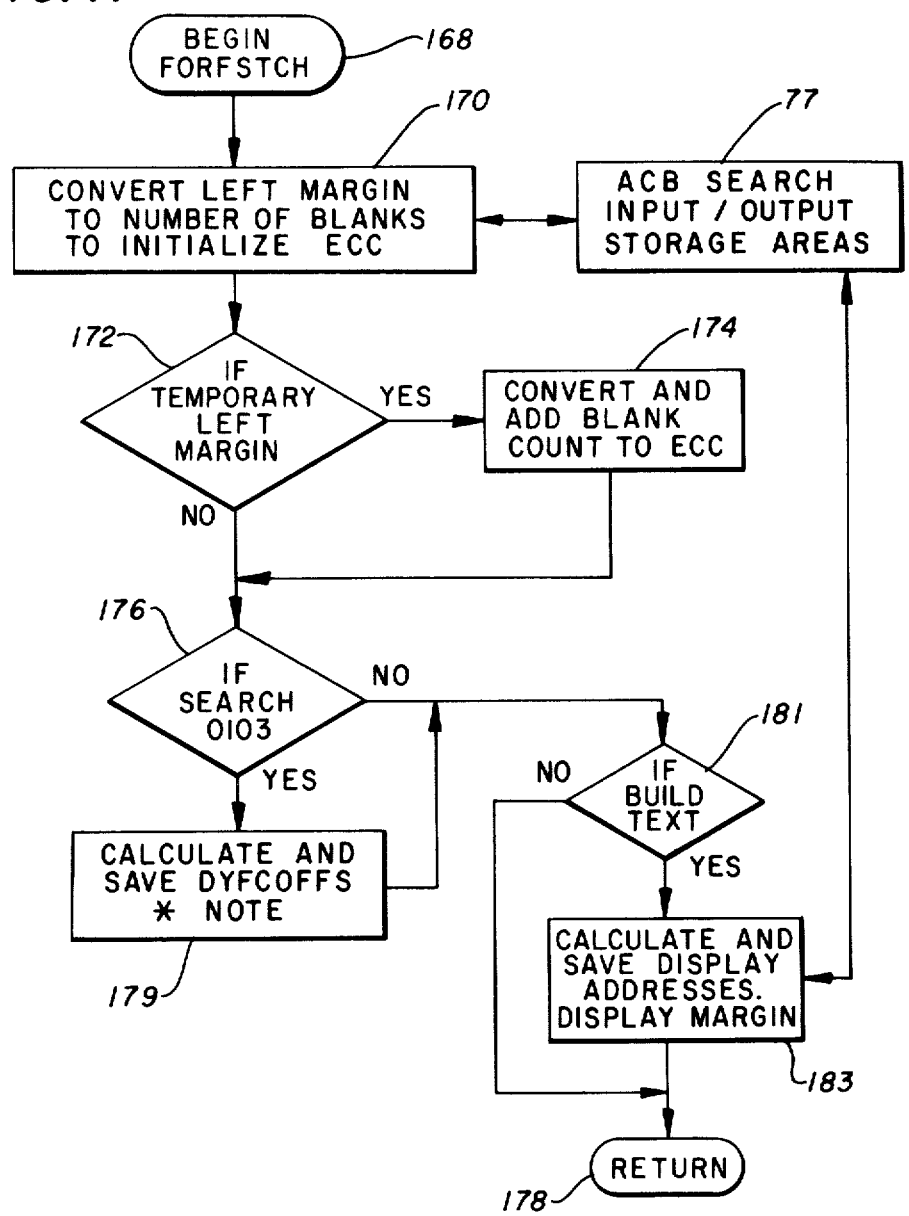
FIG. 11 illustrates the operation of a subroutine called during the servicing of the subroutine of FIG. 10 using search input/output storage areas of memory.

Referring to FIG. 11, upon entering the FORFSTCH-FORMATTER subroutine at a command 168 the left margin position retrieved from ACB storage area 77 is specified in escapement units. The cursored line pitch value is divided into the margin value to determine the number of blank character positions from the left paper edge up to, but not including, the first position at which a code may be displayed. If there is a temporary left margin (e.g., an indent tab) as determined at a test 172 then the number of spaces associated with the indent tab is added to the displayable character count at sequence 174 and the FORFSTCH-FORMATTER subroutine advances to determine if the command was called from a 0103 search subroutine at sequence 176. The test to determine if the FORFSTCH-FORMATTER subroutine was called from a 0103 search subroutine is also made if there is not a temporary left margin as determined at test 172.

Since for this call the FORFSTCH-FORMATTER subroutine of FIG. 11 was not entered from the 0103 search subroutine, it now advances to a test 181 to determine if the subroutine was entered from a "BUILD-0204" subroutine. This call of the subroutine of FIG. 11 was not called from the BUILD-0204 subroutine and the operation of the DAM program 68 returns at sequence 178 to the 0102 search subroutine of FIG. 10.

Returning to FIG. 10, upon completion of the FORFSTCH-FORMATTER subroutine at 166 the 0102 search subroutine now has initialized line start parameters, and a test 180 is made to determine if the text address currently being processed is the one identified as the new cursored character/stop address. When the text character is that desired an exit flag is set at sequence 182 and information is stored in the ACB storage area 77 to tell the calling program that the cursored address was found. The 0102 search subroutine advances to sequence 184. Instructions at sequence 184 process the character and control data to update the escapement character count (ECC), the text address and format information, including the text left margin value and the character pitch. This requires storing data from the ACB storage area 77 or from the data stream when processing.

It should be noted that some of the controls as evaluated at sequence 184 bump the character count such as a tab control, which bumps the character count to the next tab stop position on the line. There are also control codes that decrement the character count, such as required backspaces. The escapement character count data is input to the ACB storage area 77 and includes the number of characters found to get to the address of the cursored character. This character count is from the left paper edge.

Upon completion of the updating of the escapement character count at sequence 184 a test 186 is made to determine if an exit flag has been set at sequence 182 or a line end has been found. When neither of these events has occurred, then the 0102 search subroutine returns to the test 180. If either has been found at the test 186, then a test 188 is made to determine if the subroutine has advanced because of the setting of the exit flag at sequence 182. If it has then the 0102 search subroutine is completed and returns at 190 to the subroutine of FIG. 9.

When the exit flag has not been set as determined by the test 188 the line end count and format information (i.e., text left margin and character pitch) are updated at sequence 192 by addressing the ACB area 77. After saving information at sequence 192 a test 194 is made to determine if all the required lines have been processed. If not, the 0102 search subroutine returns to call the FORFSTCH-FORMATTER subroutine at sequence 166. When all required lines have been processed, the 0102 search subroutine returns at 190 to the subroutine of FIG. 9.

After completion of the 0102 search subroutine at sequence 160, the number of line ends processed, the address of the first byte after the last line end processed, the position of the text left margin value, the character pitch for the cursored line, and the number of escapement character positions from the left paper edge to the contextual cursor address is stored in the ACB area 77. Upon return of the operation of the DAM program 68 from the 0102 search subroutine, the test 197 is made to determine if the call was from the BUILD subroutine 83. If not then the number of line ends processed in the search routine is added to the Y value (previously cursored line) as the new "Y" position (the current cursored line) during the sequence 196. Next, the escapement character count, the text tube left value, the left margin value (LM) and the build pitch value are obtained from the ACB storage 77 during the sequence 198 which is also entered by a positive response to the test 197. For the purpose of simplicity in describing this embodiment, the text tube left value is set to the text left margin. When a default value exists for text tube left then the sequence advances to determine the text left margin in characters in a sequence 202. The text left margin in characters is determined by dividing the value of the text left margin by the build pitch in accordance with the formula: TLM in charac.=TLM/build pitch. Following the determination of the text left margin in characters the text tube left value is set at sequence 204 to the text left margin in characters plus one. Upon completion of the sequence 204 the update subroutine of FIG. 9 advances to set the "X" value at sequence 206. The sequence 206 is also entered when the test 200 finds that the text tube left value is not a default.

During the sequence 206 the "X" value (character position along a horizontal line) is set to the escapement character count minus the text tube left value plus one in accordance with the formula: X=ECC−TTL+1. This "X" value and the text tube left value are saved in the ACB storage 77 during a sequence 208. Following the storage of the parameters in the sequence 208 the UPDATE subroutine advances to a sequence 210 to set up in the ACB storage area 77 the previous cursored line format parameters, the starting address, and the number of line ends to process. This information is stored for the "BUILD TEXT" subroutine to be described. Following the set-up sequence 210, the UPDATE subroutine of FIG. 9 returns to the caller at return 212.

Returning to FIGS. 7A and 7B, upon completion of the UPDATE subroutine at 156, the BUILD subroutine advances to a sequence 250 to place the cursored line vertically. At the sequence 250, the cursored line is placed at a given Y position and in addition the starting line format of the first text line to be displayed is found. When the build subroutine is being run for an original build, then inputs have to be set up for the next 0101 search subroutine at 252. The next search, if required, will start at the beginning of the text storage buffer 64; if not required, the formatting of text to the refresh buffer 24 will start at the beginning of the text storage buffer. The total number of line ends processed is called at sequence 254 along with the given Y position. A test 256 is made to determine if the Y position is greater than or equal to the number of line ends saved plus one. This is given by the formula Y≧LE+1. If the result of the test 256 is positive, then the Y position is adjusted at sequence 258 so that the first text line in the text storage buffer 64 is the first displayed line, that is, Y=LE+1. After adjustment of the Y position, the build subroutine returns to the caller at 260.

Returning to the test 256, if the given Y position is not greater than or equal to the number of line ends plus one, then a test 266 is made to determine if the Y position equals one. If the Y position is equal to one, then the display format has been established, and the address of the first byte after the last line end processed is the line starting address of the first displayed line for use in formatting as processed at sequence 268. Inputs are now set up to format selected text from the text storage buffer 64 at sequence 270 and the build subroutine advances.

When the Y position is not equal to one as determined at the test 266, the 0101 search subroutine is called at command 272 to find a start line format. When calling the 0101 search subroutine at this time, the search is made until a given number of line ends are processed to find a start line format. The total number of lines to be processed is determined from the formula Total LE−Y+1. What is returned to the build subroutine at command 272 upon completion of the 0101 search subroutine is the address of the first byte after the line as determined by the previous expression. In addition the number of line ends processed will be returned to give the starting address of the first line on the display. Also returned from the search is the text left margin, all of which is needed to build text on the display screen 26.

Upon completion of the 0101 search subroutine as called at command 272 the build subroutine advances to return to the caller at 260 to the sequence 268 and through the set-up sequence 270 to return to the caller at 260. The display access memory program 68 next calls the BUILD TEXT subroutine 95 at sequence 129 of FIG. 6.

In summary, to run the BUILD subroutine from the control block 86, a build command is input to the display control block 66 and passed to the DAM program 68. In addition the display control block 66 receives as an input a text storage buffer address and the length of the text storage buffer. Also input is the contextual cursor address and the X and Y position of the cursor as selected by operator keystrokes. The display control block 66 also receives as an input the text tube left position. When the build subroutine of FIGS. 7A and 7B has been run to completion, there is output from the display control block 66 and X and Y position of the cursor on the display in addition to a text tube left position. The starting address of the cursored line is output along with the build pitch value.

Figure 12:
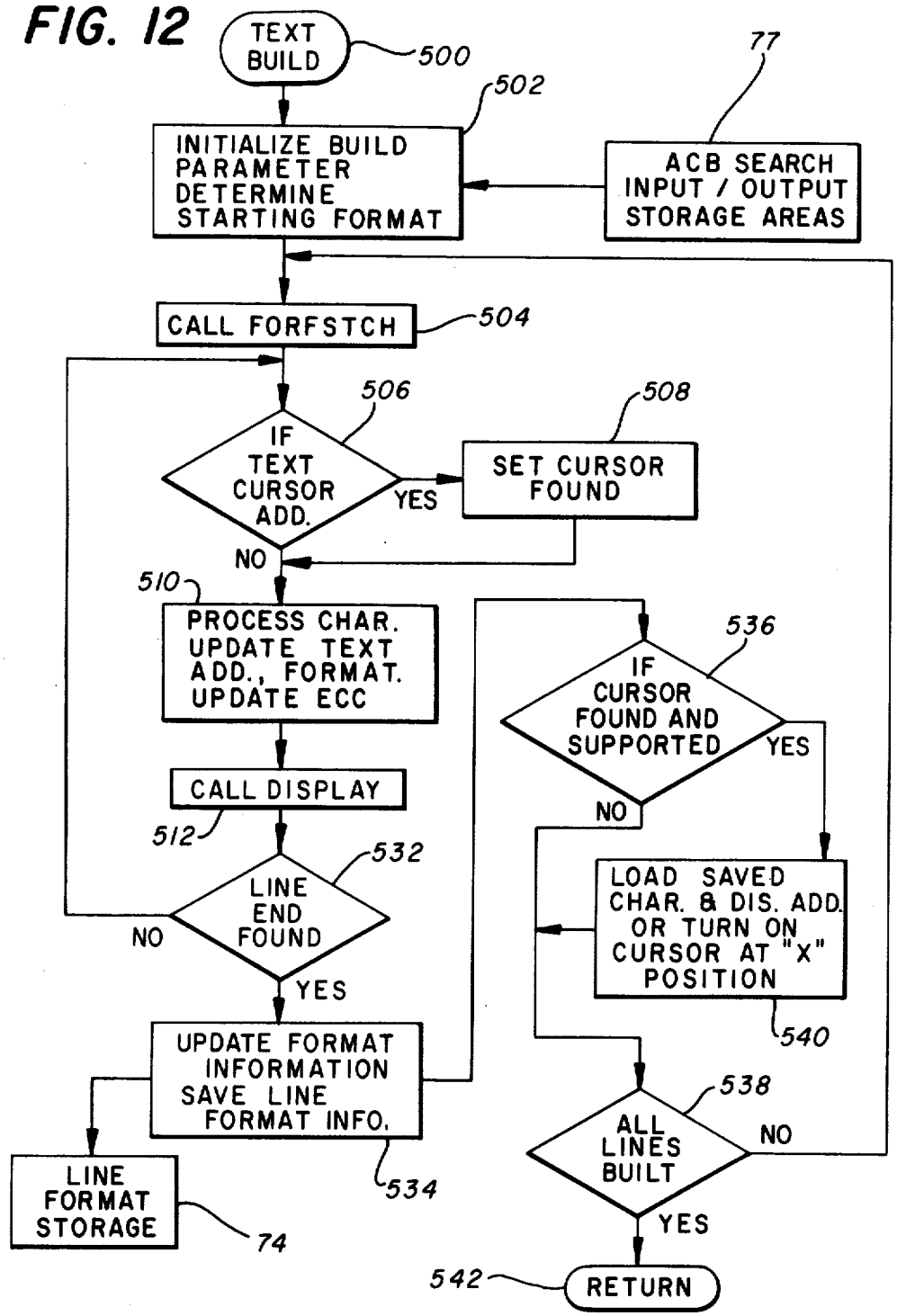
FIG. 12 illustrates the operation of one of the subroutines called during the sequence of FIG. 6 for building a mixed pitch text data stream for inputting to a refresh buffer.

Referring to FIG. 12, upon completion of the BUILD subroutine 83, the BUILD TEXT subroutine 95 is called by a text build command 500 with the subroutine initialized at sequence 502. During the initialization sequence parameters to determine the starting format of the text display are obtained from the ACB search area 77. After initialization at the sequence 502, the BUILD TEXT subroutine advances to call the FORFSTCH subroutine of FIG. 11 at the sequence 504. As previously explained, the FORFSTCH subroutine is called to initialize line start parameters. With reference to FIG. 11, for this call, the subroutine was not entered from the 0103 search subroutine so it advances through the test 176 and to the test 181 without completing the sequence 179.

The test 181 is now positive and the FORFSTCH subroutine advances to the sequence 183. During the sequence 183 the display address and a display margin are calculated and saved for use in the BUILD TEXT subroutine. The operation is then returned to the caller, which in this case is the BUILD TEXT subroutine of FIG. 12, at the return call 178.

Returning to the subroutine of FIG. 12, after running the FORFSTCH subroutine the test 506 is made to determine if this is the text cursor address. If an address match is found then a cursor found flag is set at the sequence 508 and the subroutine advances to a sequence 510. The sequence 510 is also entered if the test 506 does not find the text cursor address.

Upon entering the sequence 510 character data is processed and the text address is updated along with the text format. In addition, during the running of the sequence 510 the escapement character count is updated. Following the completion of the sequence 510 a display subroutine is called at the sequence 512.

Figure 13:
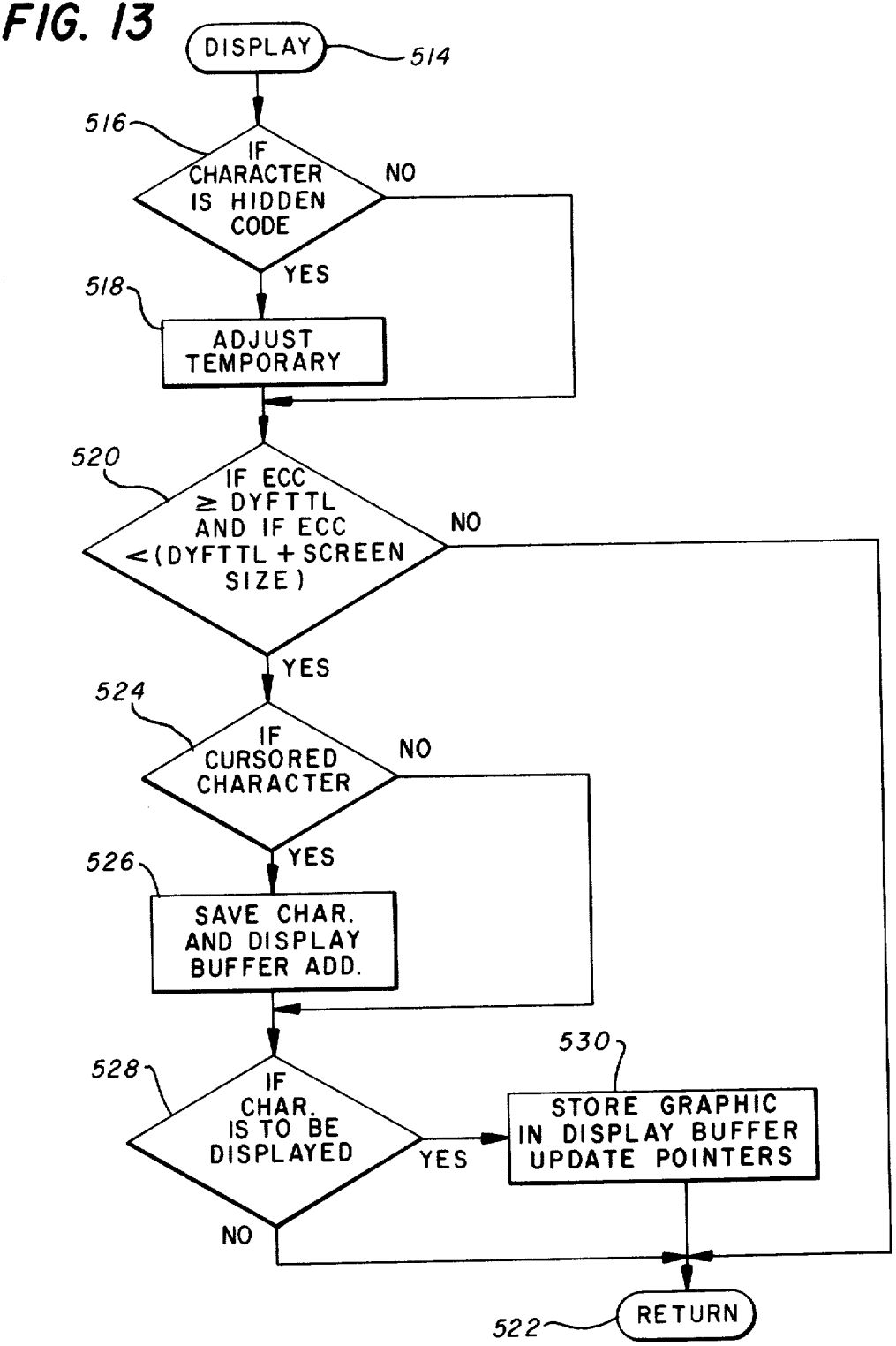
FIG. 13 illustrates the operation of a search subroutine called during the servicing of the subroutine of FIG. 12 for building a text data stream.

Referring to FIG. 13, the display subroutine is called by command 514 and upon entering the subroutine a test 516 is made to determine if a character under evaluation is a hidden code. When the character is a hidden code a temporary adjustment is made at sequence 518 and the subroutine advances to a test 520 to determine if the escapement character count is equal to or greater than the total number of escaping positions from the left paper edge to the first character position on the screen, this relationship expressed in the Figure as DYFTTL. In addition, the test 520 evaluates if the escapement character count is less than the total number of escaping positions from the left paper edge to the first character position on the screen plus the screen size. This latter part of the test is to determine if the character will appear on the display screen 26. The test 520 is also made if the test 516 indicates a negative response, that is, that the character is not a hidden code. A negative response to the test 520 indicates that the character will not appear on the display screen 26 and the display subroutine returns the sequence to the BUILD TEXT subroutine of FIG. 12 through a return call 542.

A positive response to the test 520 advances the display subroutine to a test 524 to determine if the character under consideration is cursored. A positive response advances the subroutine to a sequence 526 to save the character and the display buffer address. Upon completion of the sequence 526 a test 528 is made to determine if the character under consideration is to be displayed. This test is also entered by a negative response to the test 524. A negative response to the test 528 returns the sequence to the caller through the return call 522 which in this case is the BUILD TEXT subroutine of FIG. 12. A positive response to the test 528 advances the subroutine of FIG. 13 to a sequence 530. During the running of the sequence 530 graphic data is stored in the display buffer and pointers are updated. Upon completion of the sequence 530 operation returns to the caller through the return call 522.

Returning to FIG. 12, a return call from the display subroutine of FIG. 13 causes the BUILD TEXT subroutine to be re-entered at a test 532 to determine if a line end has been found. If a line end has not been found, indicating that there are more characters on the line, this subroutine returns to the test 506. When a line end is found by the test 532 then the subroutine advances to a sequence 534 to update format information and save line format information in the line format storage 74. After completing the sequence 534 a test 536 is made to determine if a cursor has been found and is supported on the display screen 26. If a cursor has not been found then a test 538 is made to determine if all lines on the display have been built. This test is also entered by a positive response to the test 536 through a sequence 540. The sequence 540 either stores the saved character using the saved display buffer address or turns on the cursor at the established X position. Upon completion of the sequence 540 the test 538 is run.

If not all the lines have been built at the test 538 then the subroutine of FIG. 12 returns to the sequence 504 and recycles until the test 538 produces a positive response. When all the lines have been built then the test 538 is positive and operation of the system returns to the DAM program 68 at a return call 542.

In summary, to run the BUILD TEXT subroutine a build text command is input to the ACB storage area 77 and passed to the DAM program 68. In addition, the analysis control block storage area 77 provides to the subroutine of FIG. 12 the text starting address, the contextual cursor address, a search stop address, the start address of the TSB 64 in addition to the length of the TSB. Also provided to the subroutine of FIG. 12 from the ACB storage area 77 is the X position, the text tube left value along with the left margin value and the build pitch parameter. Further, to run the BUILD TEXT subroutine of FIG. 12 the ACB storage area 77 provides data on the number of line ends to be processed. With these parameters input to the subroutine of FIG. 12 a text display is built and transferred to the refresh buffer 24 for activating the display screen 26.

Prior to gating the refresh buffer 24 to create a new display on the screen 26 the BUILD SCALE LINE subroutine 97 must be run by the DAM program 68. The scale line consists of dots for each character position on a page and at every tenth position the dot is replaced with a number indicating the character position from the left paper edge. For example, considering any pitch format, the tenth dot is character position "1", the twentieth dot is character position "2", the thirtieth dot is character position "3", etc.

Figure 14A:
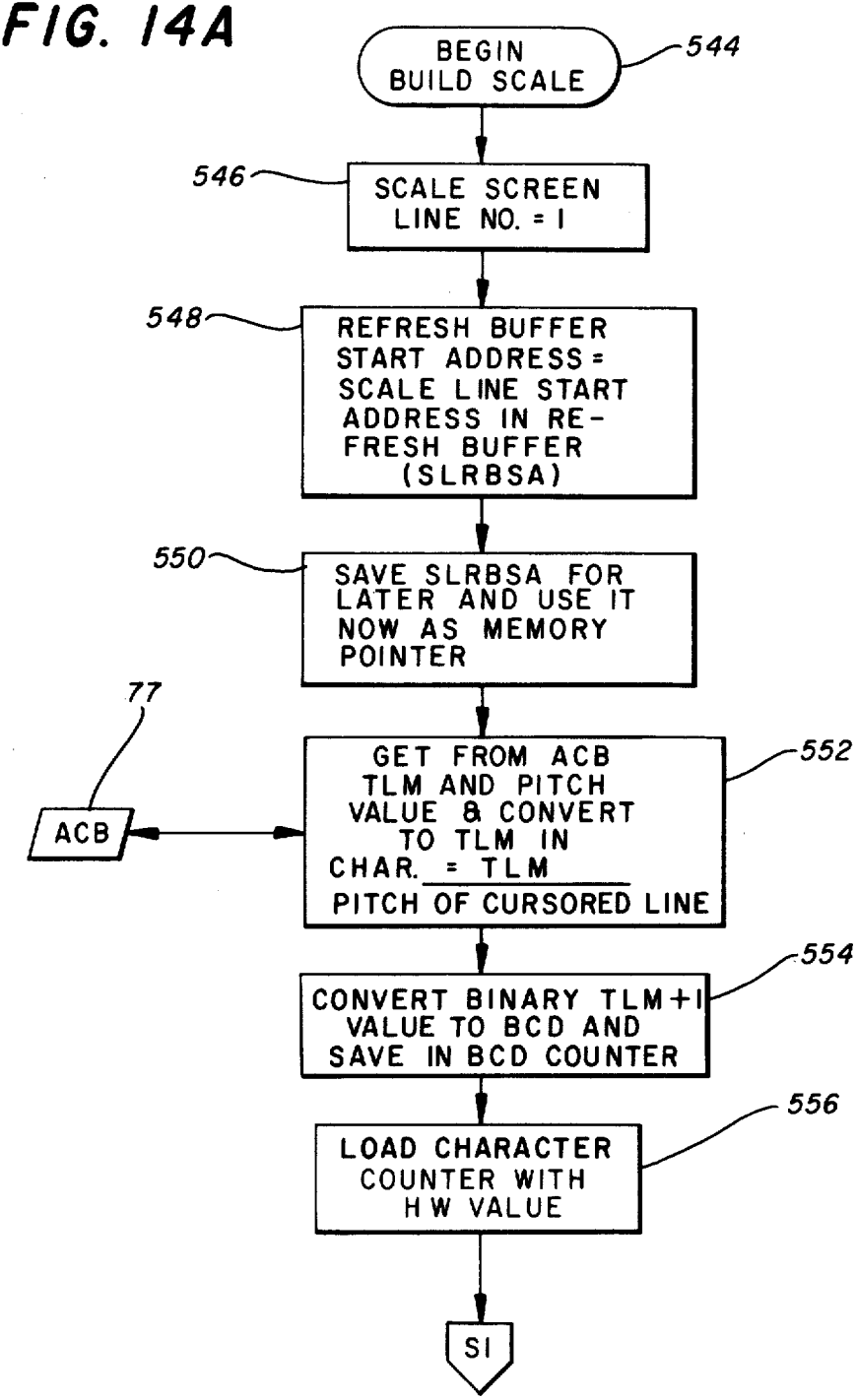
FIGS. 14A, 14B and 14C illustrate the operation of one of the subroutines called during the sequence of FIG. 6 for building a display scale image in a refresh buffer for mixed pitch display of text.
Figure 14B:
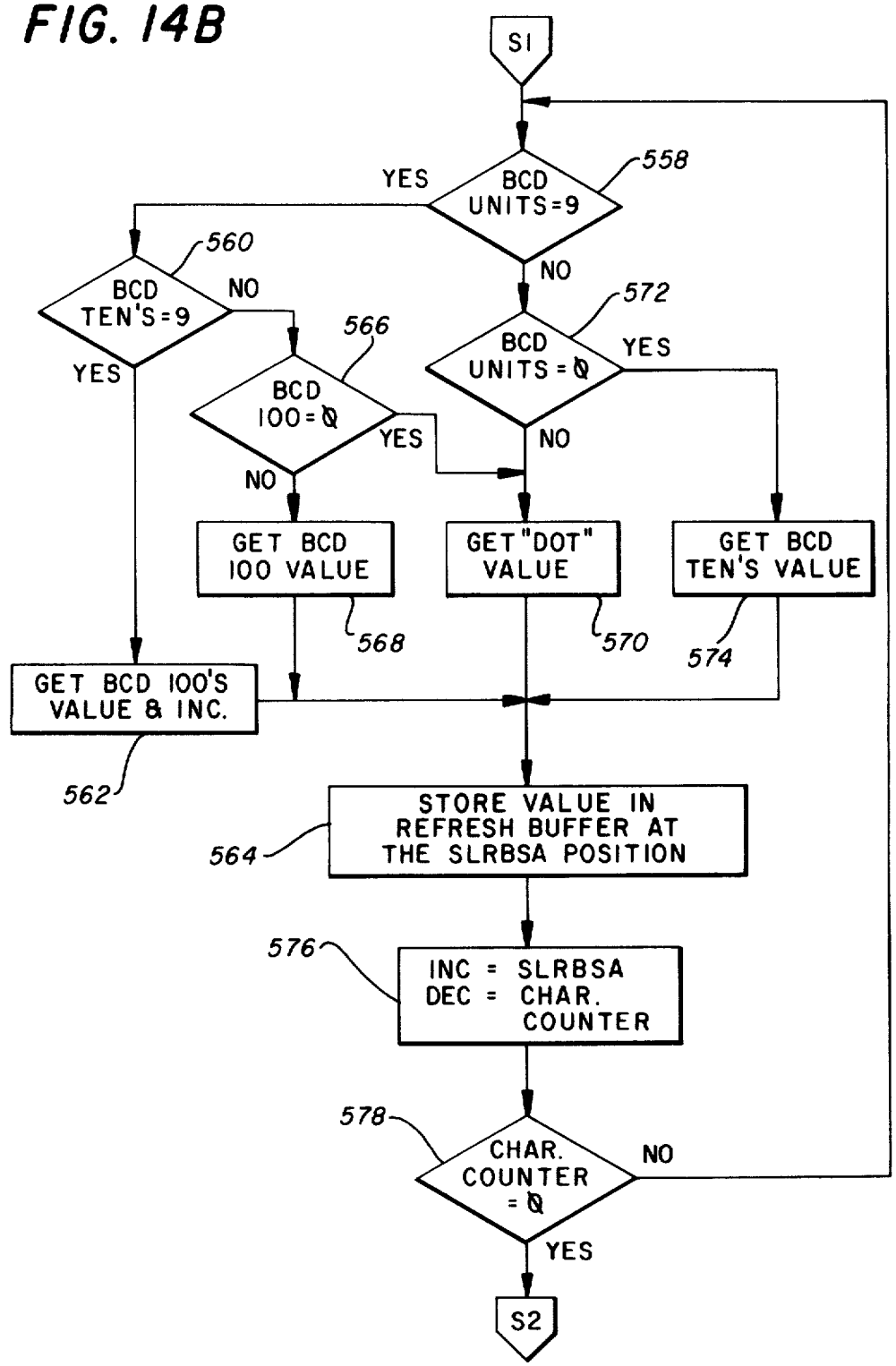
Figure 14C:
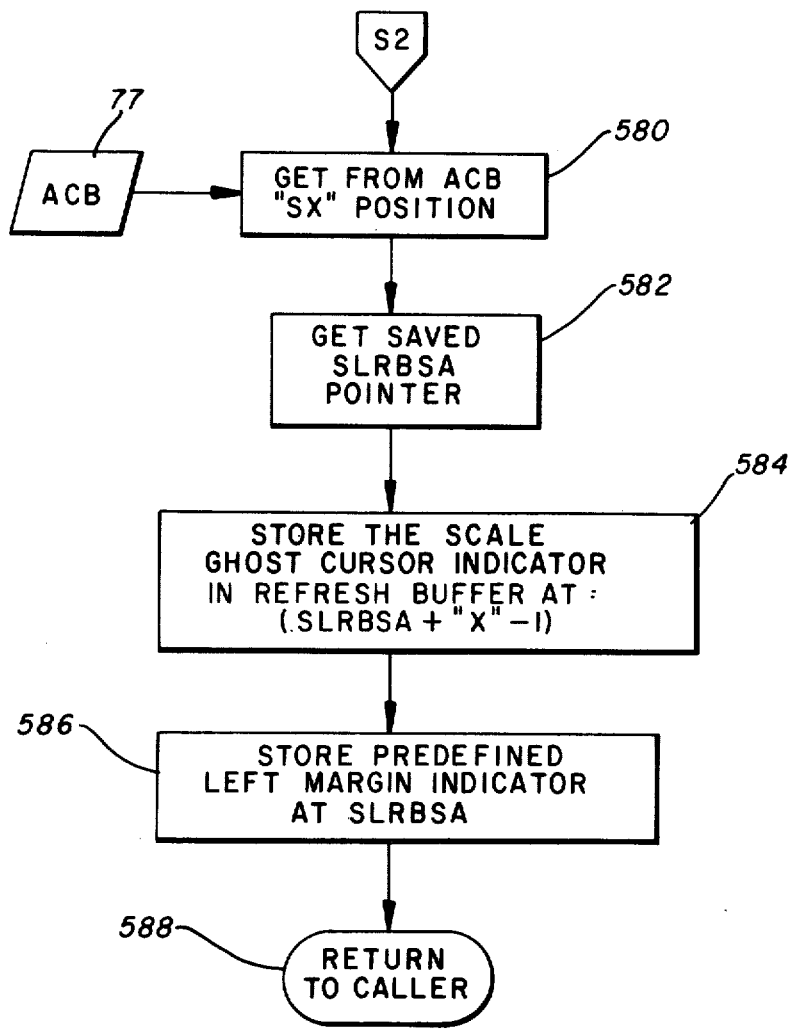

Referring to FIGS. 14A, 14B and 14C, there is shown a flow chart for the BUILD SCALE LINE subroutine which is entered at a command 544 from the DAM program 68. First a sequence 546 is run to set the scale screen line to the first line of the display screen 26. Next a sequence 548 is run to set the restart address of the refresh buffer 24 to equal the start address of the scale line display. This start address for the scale line is saved at a sequence 550 for use later and it is also used during the present running of the BUILD SCALE LINE subroutine as a memory pointer.

Upon completion of the sequence 550 parameters are obtained from the ACB storage area 77 during a sequence 552. Parameters obtained from the ACB storage area 77 include the text left margin and character pitch value. During the sequence 552 the text left margin value is converted to the "TLM in characters" value +1 as given by the formula: TLM in charac.=TLM/pitch of cursored line. In this embodiment the TTL is equal to the left margin +1. After converting the TLM and pitch value into the "TLM in character" value the BUILD SCALE LINE subroutine advances to a sequence 554 to convert the binary "TLM in character" value to binary coded decimal value and save this value in the BCD counter. Next, a sequence 556 is run to load the character counter with the HW value.

Following the sequence 556 a series of tests are run to format the scale line. First a test 558 is run to determine if the unit value of the BCD data saved in the sequence 554 equals "9". A positive response advances the subroutine to a test 560 to determine if the 10's value of the BCD data saved during the sequence 554 equals "9". Another positive response advances the subroutine to a sequence 562 which obtains the 100's value of the BCD data and increments the 100's value. Upon completion of the sequence 562 a sequence 564 is run to store the BCD value in the refresh buffer 24 at the SLRBSA position as established during the sequence 548.

A negative response to the test 560 advances the subroutine to a test 556 to determine if the 100's value of the BCD data saved during the sequence 554 is equal to zero. If not, then a sequence 568 is run to obtain the 100's value for the BCD data. This subroutine then advances to the sequence 564 which has previously been explained.

A positive response to the test 566, indicating that the 100's value is not equal to zero advances the subroutine to a sequence 570 to obtain the "DOT" value for the scale line display. This value is then stored during the sequence 564.

A negative response to the test 558 advances the subroutine to a test 572 to check if the units value of the BCD data saved during the sequence 554 is equal to zero. If not, then the "DOT" value is obtained at the sequence 570 as previously explained. A positive response to the test 572 advances the subroutine to a sequence 574 to obtain the 10's value of the BCD data for storing in the refresh buffer 24 during the sequence 564.

Whenever the subroutine enters the sequence 564 a character position number has been set for the scale line display. After completing the sequence 564 a sequence 576 is run to increment the SLRBSA value and decrement the character counter. Following the sequence 576 a test 578 is run to determine if the character counter has been decremented to zero. If not, the subroutine returns to the test series at the test 558.

A positive response to the test 578 advances the BUILD SCALE LINE subroutine to a sequence 580. During the running of the sequence 580 the "SX" position is obtained from the ACB storage area 77 and the subroutine advances to a sequence 582. During the sequence 582 the SLRBSA value saved during the sequence 550 is obtained as a pointer. With this parameter obtained the subroutine advances to a sequence 584 to store the scale ghost cursor indicator in the refresh buffer 24 at the position as given by the formula: SLRBSA + "X" − 1. Next a sequence 586 is run to store a predefined left margin indicator at the SLRBSA position. The BUILD SCALE LINE subroutine is now complete and operation returns to the DAM program 68 at a return call 588.

The BUILD SCALE LINE subroutine is run to establish a display for indicating to a user various information about a cursored line on the display screen 26. To run the BUILD SCALE LINE subroutine it receives from the ACB storage area 77 a build scale command. In addition, it receives from the ACB storage area 77 and X position value along with the text left margin value and the character pitch parameter. Upon completion of the BUILD SCALE LINE subroutine the refresh buffer 24 is loaded to place on the display screen 26 a scale line.

Figure 15A:
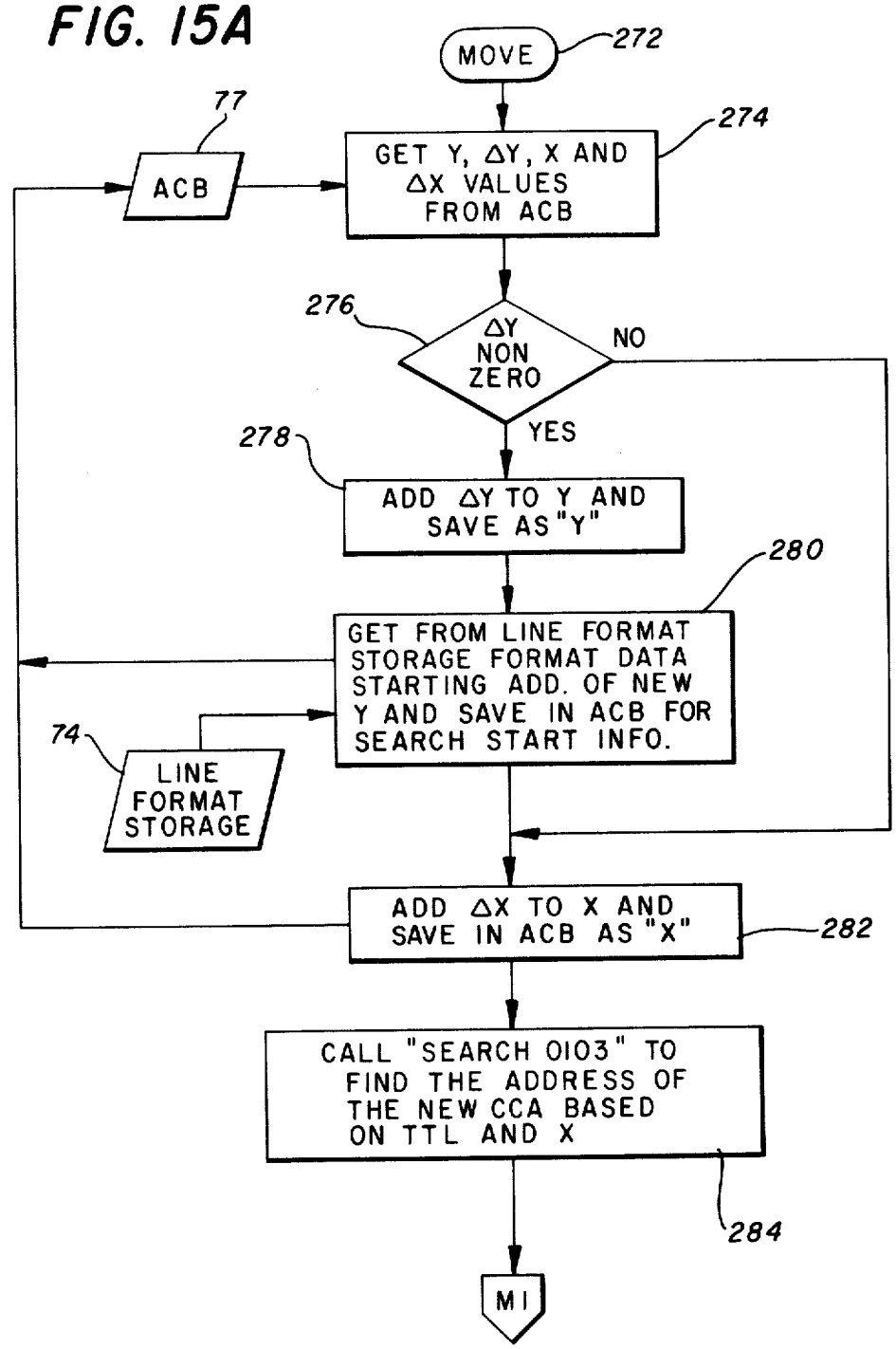
FIGS. 15A and 15B illustrate the operation of the MOVE subroutine called during the servicing of the mixed pitch display routine of FIG. 6 for a move display operation.
Figure 15B:
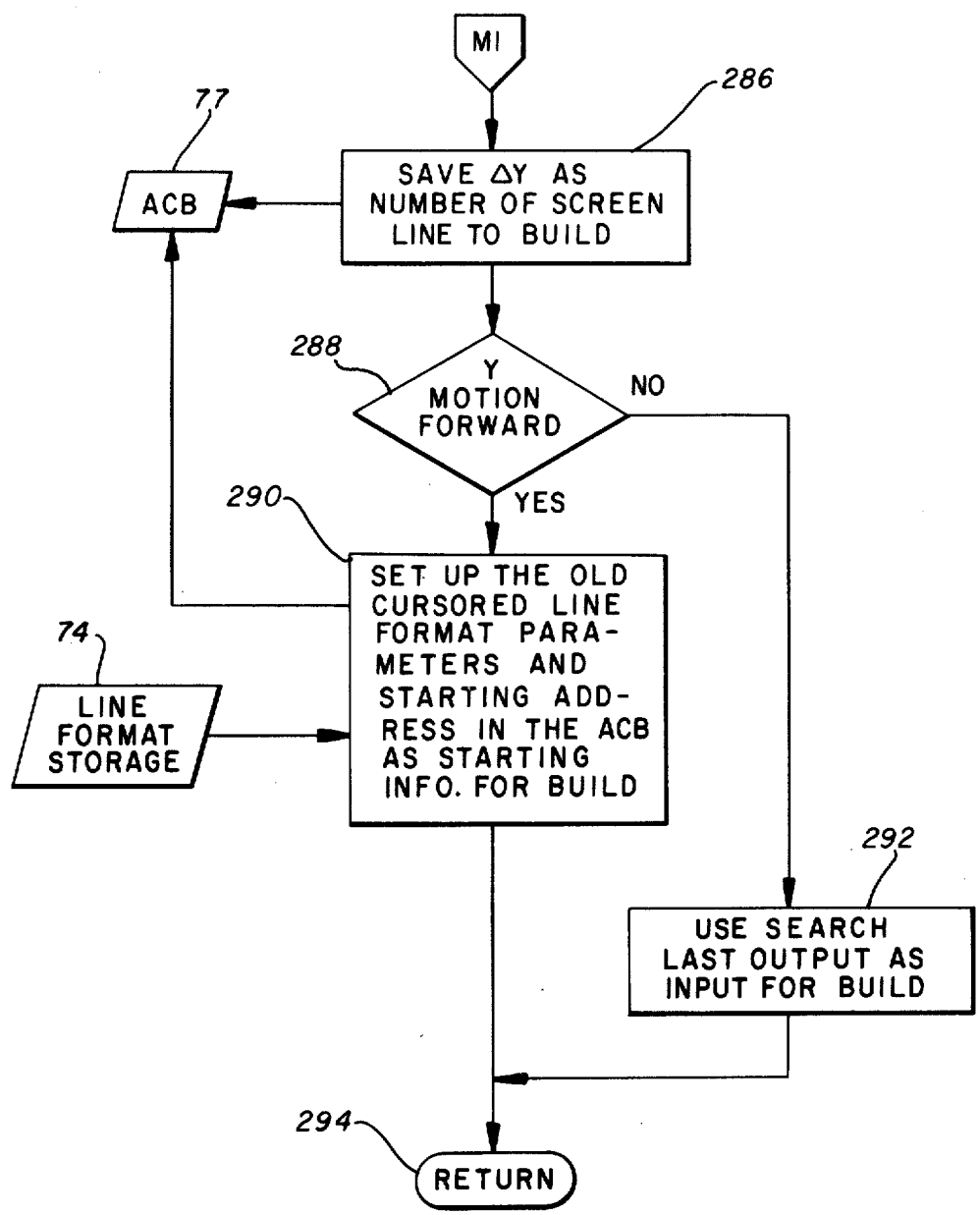

Referring to FIGS. 15A and 15B, when the control block 86 sets a bit to call the MOVE subroutine 90 a move command 271 is input to the DAM program 68. Initially, "Y" position values and $\Delta Y$ values along with X and $\Delta X$ values are obtained from the ACB storage area 77. Following retrieval of the parameters from the ACB storage area 77 the MOVE subroutine runs a test 276 to determine if there are any non-zero $\Delta Y$ values. When non-zero values of $\Delta Y$ have been obtained from the ACB storage area 77 then these non-zero values are added to the "Y" values with the result saved as a "new Y" value in a sequence 278. After completing the sequence 278 a sequence 280 is entered which obtains line format data and the starting address of the "new Y" value from line format storage 74. Format data and starting address data retrieved during the sequence 280 is stored in the ACB storage area 77 as information to be used at the start of a subsequent search. After completion of the sequence 280 or if the test 276 indicates that there are no non-zero values of $\Delta Y$, then the MOVE subroutine advances to a sequence 282. During completion of this sequence 282 the $\Delta X$ value from the ACB storage area 77 is added to the X value from ACB storage and this new value is saved as the "new X" value.

Upon completion of the sequence 282 search parameters have been established and the MOVE subroutine advances to a sequence 282 which calls the 0103 search subroutine to find the address of the new contextual cursor based on the text tube left value and the X value as established during sequence 282.

Figure 16:
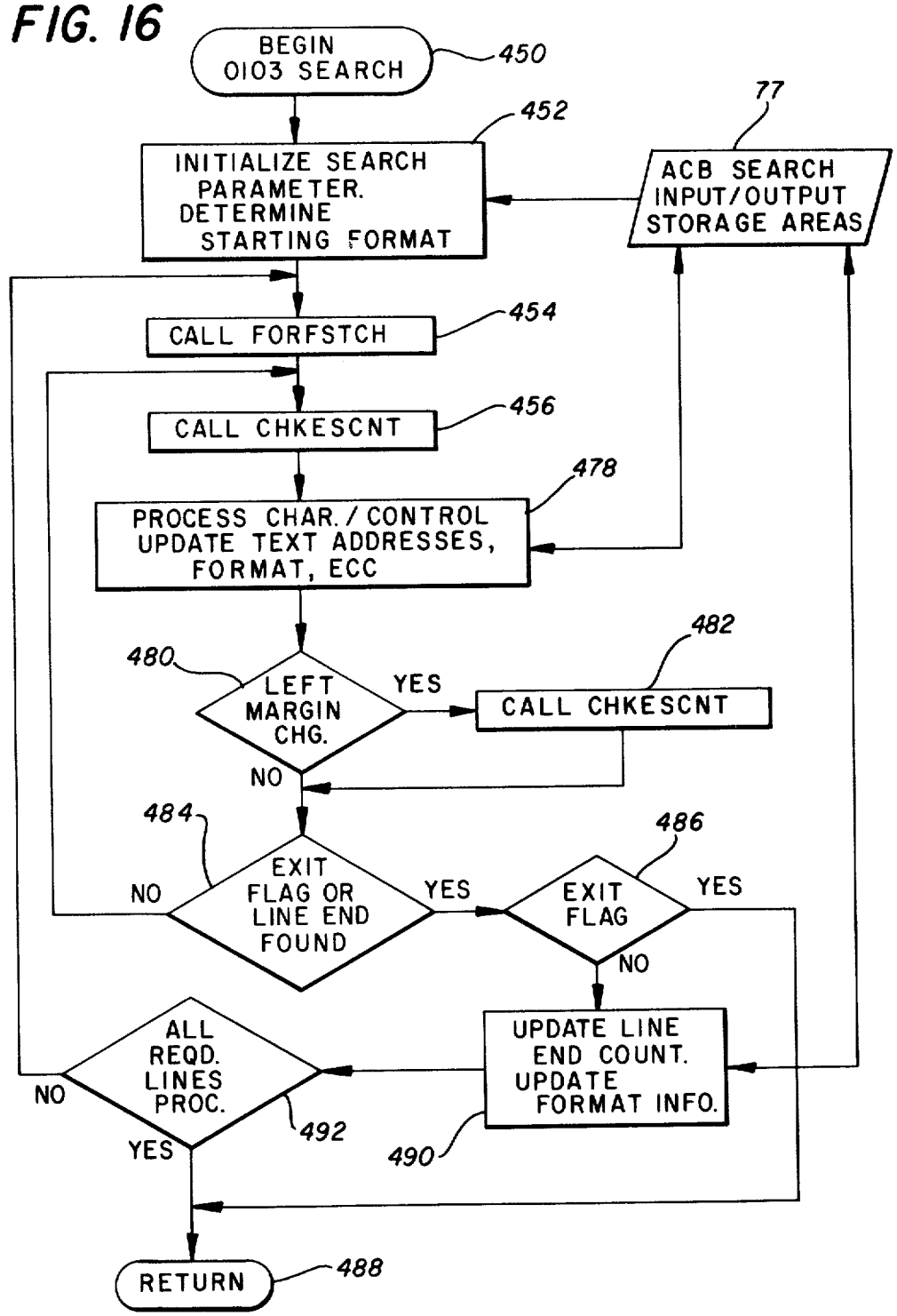
FIG. 16 illustrates the operation of a search subroutine called during the servicing of the MOVE subroutine of FIGS. 15A and 15B.

Referring to FIG. 16, there is shown a flow chart for the 0103 search subroutine called at 284 by the command 450. This search finds the new contextual cursor address given an X position and text tube left value for a line previously identified. Search parameters are initialized at sequence 452 by data from the ACB storage area 77 to determine the starting format. After initialization of the 0103 search subroutine, the FORFSTCH-FORMATTER subroutine of FIG. 11 is called which initializes the starting parameters.

Referring to FIG. 11, when the test 176 is made, a positive result advances the subroutine to a calculation and save operation 179 to determine the number of displayable characters before the X position (DYFC-OFFS). The calculation of operation 178 is given by the formula: DYFCOFFS=(TTL−1)+(X Screen Position−1). The subroutine of FIG. 11 then returns to the 0103 search subroutine of FIG. 16 through the negative path from the test 181 by means of the return call 178.

Upon completion of the subroutine of FIG. 11, as called at sequence 454, another subroutine is called at sequence 456 to check the displayable character count against a calculated cursor location.

Figure 17:
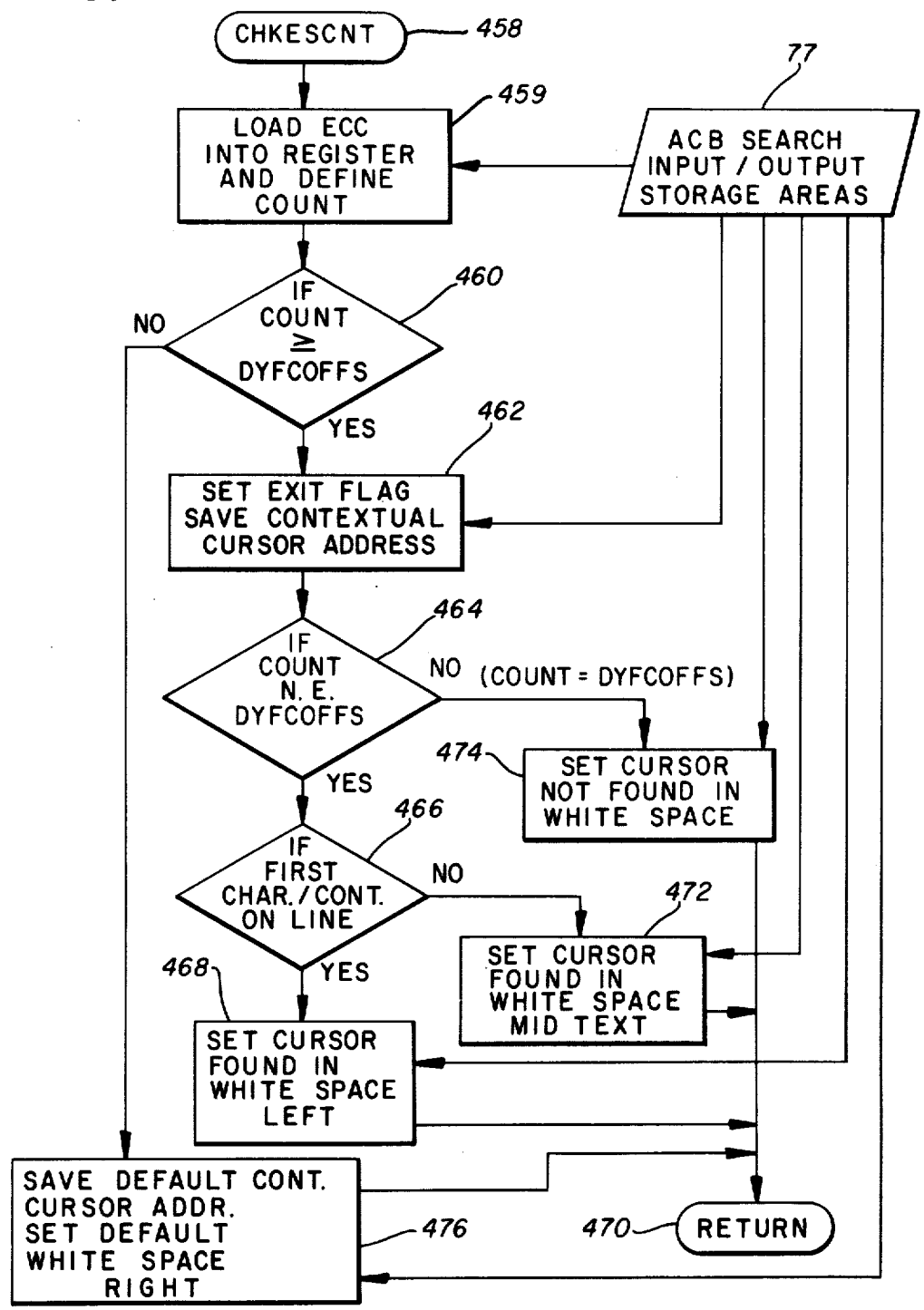
FIG. 17 illustrates the operation of a subroutine called during the servicing of the search operation of FIG. 16.

Referring to FIG. 17, the subroutine called at sequence 456 is entered at a command 458 which is followed by a load sequence 459. During running of the load sequence 459 the escapement character count value from the ACB storage area 77 is loaded into a register to define the character count. Next, a test 460 is made to determine if the defined count is greater than or equal to the number of the displayable characters before the X position. If the result of this test is positive, then an exit flag is set at sequence 462 to save the contextual cursor address for display formatting. Next a test 464 is made to determine if the defined count is equal to the number of displayable characters before the X position.

If an equality does not exist then a test 466 is made to determine if the byte being processed is the first character or control on the line. If this is the first character byte or control byte is on the identified line then the contextual cursor address set in "white space left" at sequence 468. The set contextual cursor address is retained in the ACB storage area 77. When the contextual cursor address is set at sequence 468 the indication is that the cursor will appear on the display in the left margin or a temporary margin. Following sequence 468 the subroutine of FIG. 17 returns to the 0103 search subroutine at a return call 470.

Returning to the test 466, if the character byte or control byte being processed is not the first byte on the line the white space indicator is set in white space in mid text at a sequence 472 with the address data retained in the ACB storage area 77. Under these conditions the contextual cursor address is in white space generated in text, that is, identified by tabs.

If the defined count is equal to the number of displayable characters for an X position then the contextual cursor address is on a text line and set at sequence 474 for retention in the ACB storage area 77. With the setting of the contextual cursor address at sequence 474 the subroutine returns through the return call 470 to the 0103 search subroutine of FIg. 16.

When the test 460 provides a negative result then a default contextual cursor address is saved at sequence 476 in the ACB storage area 77 and a new default contextual cursor address is set in white space and also saved in the ACB storage area 77. A contextual cursor address set at sequence 476 indicates that the cursor is in the right margin. Again this completes the subroutine of FIG. 17 and the operation returns to sequence 456 of FIG. 16.

Returning to FIG. 16, following a return at command 456, character byte and control byte data for the identified line is processed at sequence 478 and the escapement character count and the text address are updated. Text address and format information is also generated into the ACB storage area 77. A test 480 is made to determine if the left margin has changed and if it has then the subroutine of FIG. 17 is again called at command 482 and returns to a test 484. The test 484 is also made when the left margin has not changed as determined by the test 480. Test 484 checks to determine if an exit flag or if a line end has been found in the identified line. If not, then the subroutine of FIG. 16 returns to sequence 456 to again call the subroutine of FIG. 17. If an exit flag or a line end has been found, then a test 486 is made to determine if it was an exit flag that was found at test 484. If it was an exit flag then the 0103 search subroutine completes and returns to the MOVE subroutine of FIGS. 15A and 15B at a return call 488.

If an exit flag has not been set, then following the test 486 a line end count is updated at sequence 490. Also updated at sequence 490 is format information with the updated information saved in the ACB storage area 77. Following the updating sequence 490 a test 492 is made to determine if all the required lines have been processed by the subroutine. If not the subroutine recycles to command 454 until all the required lines have been processed at which time the subroutine of FIG. 16 completes and returns to the MOVE subroutine of FIGS. 15A and 15B through the return call 488.

Returning to FIGS. 15A and 15B, upon completion of the 0103 search subroutine of FIG. 16, the MOVE subroutine continues at a sequence 286 to save the ΔY value in the ACB storage area 77. This ΔY value represents the number of lines on the display screen 26 which will be built during this running of the MOVE subroutine. Upon completion of the sequence 286 a test 288 is made to determine if the line motion (the Y value) is in the forward or reverse direction with reference to the displayed text. A forward motion as determined by the test 288 advances the MOVE subroutine to a sequence 290 which sets up the present cursored line format parameters and the starting address of the old cursored line in the ACB storge area 77. This information is stored as starting information for a subsequent "BUILD TEXT" subroutine. The present cursored line format parameters and the starting address are obtained from the line format storage 74. Upon completion of the sequence 290 the MOVE subroutine returns to the caller at return 294.

A backward motion as determined by the test 288 advances the MOVE subroutine to a sequence 292. During the running of the sequence 292 the last 0103 search output is used as the input for the BUILD TEXT subroutine. After running of the sequence 292 the MOVE subroutine is complete and returns to the caller at return 294.

The MOVE subroutine is run to relocate the spatial contextual cursor address and generate a new contextual cursor address. To run the MOVE subroutine from the control block 86 a MOVE command is input to the display control block 66 and passed to the DAM program 68. In addition, the display control block 66 receives as an input a text storage buffer address and the length of the text storage buffer. Also input is the contextual cursor address and the XY position of the cursor as selected by operator keystrokes. The display control block 66 also receives as an input the cursored line address, the text tube left position, ΔX and ΔY values and a build pitch parameter value. When the MOVE subroutine of FIGS. 15A and 15B has been run to completion, there is available for output from the display control block 66 the contextual cursor address, the cursored line address, the X and Y position of the cursor on the display in addition to the text tube left position and white space indicators.

After running either the BUILD subroutine 83, the UPDATE subroutine 87, or the MOVE subroutine 91, the DAM program 68 will next sequence to run the BUILD TEXT subroutine 95 of FIG. 12 for generating output signals to the refresh buffer 24. The BUILD TEXT subroutine 95 obtains data and parameters from the text storage buffer 64 to generate the required format signals for presentation of text to a user on the display screen 26.

Following the running of the BUILD TEXT subroutine 95 the DAM program 68 is then sequenced to run the BUILD SCALE LINE subroutine 97 of FIGS. 14A and 14B. Thus, the subroutines 95 and 97 always follow the BUILD subroutine 83 and the MOVE subroutine 91, and follows the UPDATE subroutine 87 when called from the operation 86.

While only one embodiment of the invention, together with modifications thereof, has been described in detail herein and shown in the accompanying drawings, it will be evident that various further modifications are possible without departing from the scope of the invention.

We claim:

1. Apparatus for indicating how a mixed pitch presentation of characters will appear on an output device capable of outputting mixed pitch characters, utilizing a display which displays fixed pitch characters, comprising:

means for storing a mixed pitch unformatted data stream to be presented on the display, the data stream containing graphic characters and pitch data for each character, means for calculating in accordance with said pitch data the starting address for the left margin of each text line to be presented with respect to a fixed reference on said display, means for building a scale data stream representing a scale line on the display from the pitch data to provide a presentation of the pitch of characters to a user, means for building a text data stream representing a text presentation on the display from the graphic character data, a refresh buffer receiving both the scale data stream and the text data stream for generating an output of 20 text lines on said display, said text lines having fixed size characters, and means responsive to movement of a cursor through said lines of text for updating the scale data stream from the pitch data for a cursored text line.

2. Apparatus for indicating how a mixed pitch presentation of characters will appear as set forth in claim 1 wherein said means for building a text data stream includes means for processing a cursor keystroke into a spatial position to present a cursored line on the display.

3. Apparatus for indicating how a mixed pitch presentation of characters will appear as set forth in claim 2 wherein said means for building a text data stream includes means for building the data stream for the format of the cursored character line and for building the data stream for the first text line on the display.

4. Apparatus for indicating how a mixed pitch presentation of characters will appear as set forth in claim 2 wherein said means for building a scale data stream includes means for building a data stream for the left margin parameters for each line of presented characters on the display.

5. Apparatus for indicating how a mixed pitch presentation of characters will appear as set forth in claim 2 including means for updating the text data stream for the cursored text line, wherein said refresh buffer receives the updated scale data stream and the updated text data stream for generating an output to the display.

6. Apparatus for indicating how a mixed pitch presentation of characters will appear as set forth in claim 1 wherein said fixed reference is a visual representation on said display of a paper edge corresponding to an edge of a hard copy printout.

7. Apparatus for indicating how a mixed pitch presentation of characters will appear as set forth in claim 1 wherein said control data includes information describing the pitch of each character, the starting address of data in said storing means, the text length in said storing means, and left and right margins.

8. Apparatus for indicating how a mixed pitch presentation of characters will appear as set forth in claim 1 wherein said means for calculating also calculates the pitch of the characters for each line on the display.

9. Apparatus for indicating how a mixed pitch presentation of characters will appear on an output device capable of outputting mixed pitch characters, utilizing a display which displays fixed pitch characters, comprising:

means for generating character and control data bytes in response to operator keystrokes including character and control bytes for left margin position and character pitch, means for processing the character and control bytes from said means for generating in response to operational instructions, said processing means calculating with respect to a fixed reference on said display, the starting address for said left margin position of each text line to be presented on the display, and means for storing operating instructions for said means for processing and for generating output signals to the display, said means for storing including a text storage buffer for storing mixed pitch graphic character data and control data bytes, a display control block receiving input controls and formatting information to generate output controls and formatting information, a display access method program having data bus links to the text storage buffer and the display control block, the display access method program including a program for building a scale data stream representing a scale line on the display from pitch data control bytes and a program for building a text data stream representing a text presentation on the display from character bytes, said display access method program including instructions for updating the scale data stream from pitch data for a text line having a cursor thereon, and a display refresh buffer having a data bus interconnection to the display access method program and responsive to the scale data stream and the text data stream for outputting signals to the display.

10. Apparatus for indicating how a mixed pitch presentation of characters will appear as set forth in claim 9 including an applications program having a data bus link to the text storage buffer and the display control block to provide instructions for a selected operation of the display access method program.

11. Apparatus for indicating how a mixed pitch presentation of characters will appear as set forth in claim 9 including a line format storage area for storing format data for each displayed line, the format data including the left margin, character pitch, and line starting address.

12. Apparatus for indicating how a mixed pitch presentation of characters will appear as set forth in claim 9 wherein said means for storing further includes an analysis control block having a data bus link to the display access method program to pass parameters between various subroutines of the access method program.

13. Apparatus for indicating how a mixed pitch presentation of characters will appear as set forth in claim 9 including means for generating character and control data bytes for locating a cursor on the display.

14. Apparatus for indicating how a mixed pitch presentation of characters will appear as set forth in claim 13 wherein the display access method program includes instructions for building the data stream for the format of a text line having the cursor thereon.

15. Apparatus for indicating how a mixed pitch presentation of characters will appear as set forth in claim 14 wherein the display access method program includes instructions for updating the text data stream for the cursored line.

16. A method for indicating how a mixed pitch presentation of characters will appear on an output device capable of outputting mixed pitch characters, utilizing a display which displays fixed pitch characters, comprising the steps of:

retrieving data from storage, the data including: (1) the starting address of data in a text storage buffer, (2) the text length of the text storage buffer, (3) mixed pitch graphic character bytes, (4) control bytes including right and left margins and character pitch, computing outputs from the data retrieved, including (1) the starting address and format of a scale line, (2) the starting address for the left margin of each text line on the display with respect to a fixed reference thereon, (3) the pitch of the characters for each line on the display, and (4) a reformatted scale line for the pitch of the characters on a cursored line, generating a scale data stream representing a scale line on the display to provide a presentation of the pitch of characters to a user, and using the outputs as computed to transfer a portion of text to a refresh buffer to build a visual presentation of text lines on said display.

17. A method for indicating how a mixed pitch presentation of characters will appear on a display as set forth in claim 16 wherein the step of retrieving data from storage includes retrieving a contextual cursor address from the text storage buffer, and the position to place the contextual cursor on the display.

18. A method for indicating how a mixed pitch presentation of characters will appear on a display as set forth in claim 16 wherein the step of computing outputs includes computing the starting address for a cursored text line and the starting address for the text line identified as the first line on the display.

* * * * *